(12) United States Patent
Tanahashi

(10) Patent No.: US 8,321,724 B2
(45) Date of Patent: Nov. 27, 2012

(54) DOCUMENT ERROR INFERENCE PROCESSING PROGRAM, PROCESSING DEVICE AND PROCESSING METHOD

(75) Inventor: Kazuya Tanahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 790 days.

(21) Appl. No.: 12/409,570

(22) Filed: Mar. 24, 2009
(Under 37 CFR 1.47)

(65) Prior Publication Data
US 2010/0042909 A1    Feb. 18, 2010

Related U.S. Application Data

(63) Continuation of application No. PCT/JP2006/319674, filed on Oct. 2, 2006.

(51) Int. Cl.
*G06F 11/00* (2006.01)
(52) U.S. Cl. .................... 714/49; 707/690; 714/799
(58) Field of Classification Search .................. None
See application file for complete search history.

(56) References Cited

U.S. PATENT DOCUMENTS
2005/0021427 A1    1/2005    Takahashi et al.

FOREIGN PATENT DOCUMENTS
| JP | 2001-75958 | 3/2001 |
| JP | 2005-43932 | 2/2005 |
| JP | 2005-267195 | 9/2005 |

OTHER PUBLICATIONS

Written Opinion of the International Searching Authority, International Application No. PCT/JP2006/319674, Filed Oct. 2, 2006.

(Continued)

*Primary Examiner* — Scott Baderman
*Assistant Examiner* — Jason Bryan
(74) *Attorney, Agent, or Firm* — Greer, Burns & Crain, Ltd.

(57) ABSTRACT

A device includes a taxonomy schema; a display link base; a calculation link base; an XBRL document memory unit which stores an instance; an error inference unit which compares a calculated value of an input value of the instance corresponding to an item element of the calculation value in accordance with the calculation link base with the input value of the instance corresponding to the calculated value based on the display link base, detects a discrepancy between the calculation value and the input value, specifies a calculation tree structure of the calculation link base including the item element in which the discrepancy is detected and a display tree structure of the display link base including the item element in which the discrepancy is detected, and infers that a state of too many or too few item elements is regarded as a discrepancy error in the case that such an item element is set only in either one of the trees and that the item element has an input that is consistent with an absolute value of the difference between the input value and the calculated value; and an inference result display processing unit which outputs the error inferred result.

8 Claims, 24 Drawing Sheets

OTHER PUBLICATIONS

Norio Takahashi et al.; "Ugoki Hajimeta Zaim Kaikei Data Hyojun XBRL (Financial and Accounting Data Standard XBRL starts turning)"; Joho Shori, Japan; Mar. 15, 2005; vol. 46, No. 3, p. 301 (right col.), lines 16-23.

Yohei Hachihata et al.; "Taxsonomy no Kaitei ni Taio shita XBRL Bunsho no Saikochiku Shuho (Reconstruction method of an SBRL document corresponding to revision of taxonomy);" IEICE Technical Report, ss2004/26-33; The Institute of Electronics, Information and Communication Engineers, Japan; Nov. 18, 2004; vol. 104, No. 466, pp. 31-36.

Rejection decision of Chinese Patent Office in Chinese Patent App. No. 200680056003.0, issued May 3, 2012 (with translation).

```
<?xml version="1.0" encoding="UTF-8"?>
<xsd:schema xmlns:link="http://www.xbrl.org/2003/linkbase"
xmlns:xlink="http://www.w3.org/1999/xlink"
xmlns:xsd="http://www.w3.org/2001/XMLSchema"
xmlns:xbrli="http://www.xbrl.org/2003/instance"
xmlns:fj="http://www.fujitsu.com/xbrl/taxeditor/sample"
targetNamespace="http://www.fujitsu.com/xbrl/taxeditor/sample"
elementFormDefault="qualified">
  <xsd:annotation>
    <xsd:appinfo>

··· REFERENCE TO EACH LINK BASE FILE IS DESCRIBED ···
      ··· DECLARATION OF EXTENDED LINK ROLE IS DESCRIBED ···

</xsd:appinfo>
  </xsd:annotation>

··· import STATEMENTS OF OTHER TAXONOMY SCHEMA AND XBRL
SPECIFICATION SCHEMA ARE DESCRIBED ···

<xsd:element name="ABC_Title" abstract="true" id="p0_ABC_Title"
xbrli:periodType="instant"/>
    <xsd:element name="A" id="p0_A" xbrli:balance="debit" xbrli:periodType="instant"/>
    <xsd:element name="B" id="p0_B" xbrli:balance="debit" xbrli:periodType="instant"/>
    <xsd:element name="C" id="p0_C" xbrli:balance="debit" xbrli:periodType="instant"/>
    <xsd:element name="ABC" id="p0_ABC" xbrli:balance="debit"
xbrli:periodType="instant"/>
   <xsd:element name="XYZ_Title" abstract="true" id="p0_XYZ_Title"
     xbrli:periodType="duration"/>
    <xsd:element name="X" id="p0_X" xbrli:balance="credit" xbrli:periodType="duration"/>
    <xsd:element name="Y" id="p0_Y" xbrli:balance="credit" xbrli:periodType="duration"/>
    <xsd:element name="Z" id="p0_Z" xbrli:balance="credit" xbrli:periodType="duration"/>
    <xsd:element name="XYZ" id="p0_XYZ" xbrli:balance="credit"
xbrli:periodType="duration"/>
</xsd:schema>

··· abstract ATTRIBUTE IS REGARDED AS false IF NOT DESCRIBED ···
```

FIG. 2

```xml
<?xml version="1.0" encoding="UTF-8"?>
<link:linkbase xmlns:link="http://www.xbrl.org/2003/linkbase"
xmlns:xbrli="http://www.xbrl.org/2003/instance" xmlns:xlink="http://www.w3.org/1999/xlink"
xmlns:xsi="http://www.w3.org/2001/XMLSchema-instance"
xsi:schemaLocation="http://www.xbrl.org/2003/linkbase http://www.xbrl.org/2003/xbrl-linkbase-
2003-12-31.xsd" xmlns:fj="http://www.fujitsu.com/xbrl/taxeditor/sample">
 <link:roleRef roleURI="http://www.fujitsu.com/BalanceSheet" xlink:type="simple"
xlink:href="sample.xsd#BS"/>
 <link:roleRef roleURI="http://www.fujitsu.com/IncomeStatements" xlink:type="simple"
xlink:href="sample.xsd#PL"/>
 <link:presentationLink xlink:type="extended" xlink:role="http://www.fujitsu.com/BalanceSheet">
   <link:loc xlink:type="locator" xlink:href="sample.xsd#p0_ABC_Title" xlink:label="ABC_Title"
xlink:title="ABC_Title"/>
   <link:loc xlink:type="locator" xlink:href="sample.xsd#p0_A" xlink:label="A" xlink:title="A"/>
   <link:presentationArc xlink:type="arc" xlink:from="ABC_Title" xlink:to="A" order="1.0"/>
   <link:loc xlink:type="locator" xlink:href="sample.xsd#p0_B" xlink:label="B" xlink:title="B"/>
   <link:presentationArc xlink:type="arc" xlink:from="ABC_Title" xlink:to="B" order="2.0"/>
   <link:loc xlink:type="locator" xlink:href="sample.xsd#p0_C" xlink:label="C" xlink:title="C"/>
   <link:presentationArc xlink:type="arc" xlink:from="ABC_Title" xlink:to="C" order="3.0"/>
   <link:loc xlink:type="locator" xlink:href="sample.xsd#p0_ABC" xlink:label="ABC"
xlink:title="ABC"/>
   <link:presentationArc xlink:type="arc" xlink:from="ABC_Title" xlink:to="ABC" order="4.0"/>
 </link:presentationLink>
 <link:presentationLink xlink:type="extended"
xlink:role="http://www.fujitsu.com/IncomeStatements">

···  INCOME STATEMENT IS DEFINED IN SIMILAR WAY  ···

</link:presentationLink>

··· BY THESE REPRESENTATIONS, CONSOLIDATED BALANCE SHEET (CURRENT FISCAL YEAR),
CONSOLIDATED INCOME STATEMENT (CURRENT FISCAL YEAR), CONSOLIDATED CASH FLOW
STATEMENT (CURRENT FISCAL YEAR),CONSOLIDATED BALANCE SHEET (PREVIOUS FISCAL YEAR),
CONSOLIDATED INCOME STATEMENT (PREVIOUS FISCAL YEAR), CONSOLIDATED CASH FLOW
STATEMENT (PREVIOUS FISCAL YEAR),NON-CONSOLIDATED BALANCE SHEET (CURRENT FISCAL
YEAR), NON-CONSOLIDATED INCOME STATEMENT (CURRENT FISCAL YEAR), NON-CONSOLIDATED
CASH FLOW STATEMENT (CURRENT FISCAL YEAR),NON-CONSOLIDATED BALANCE SHEET (PREVIOUS
FISCAL YEAR), NON-CONSOLIDATED INCOME STATEMENT (PREVIOUS FISCAL YEAR), NON-
CONSOLIDATED CASH FLOW STATEMENT (PREVIOUS FISCAL YEAR), ETC.
   ARE DESCRIBED AS NEEDED. EACH FINANCIAL STATEMENT IS DISTINGUISHED BY role ATTRIBUTE
OF presentationLink ELEMENT AND REPRESENTED AS DIFFERENT TREE STRUCTURE.  ···

</link:linkbase>
```

FIG. 3

(A)
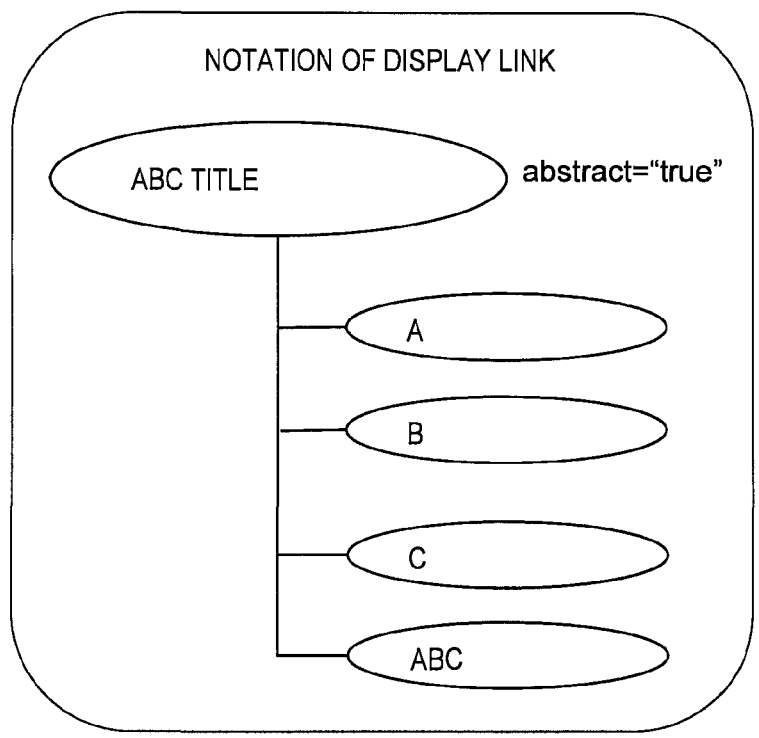
(B)
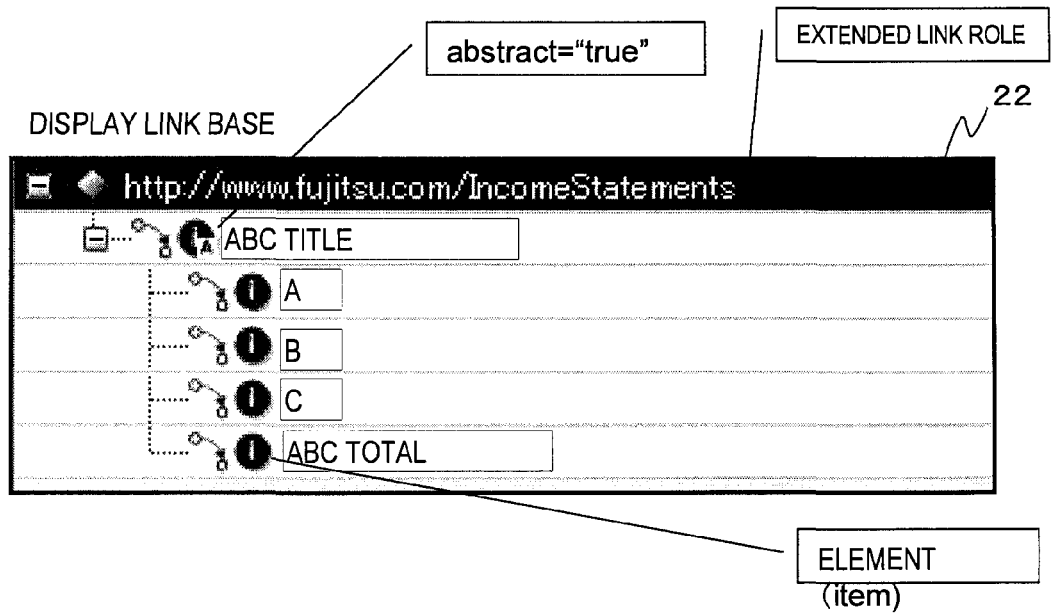
FIG. 4

23

```
<link:linkbase xmlns:link="http://www.xbrl.org/2003/linkbase"
xmlns:xbrli="http://www.xbrl.org/2003/instance" xmlns:xlink="http://www.w3.org/1999/xlink"
xmlns:xsi="http://www.w3.org/2001/XMLSchema-instance"
xsi:schemaLocation="http://www.xbrl.org/2003/linkbase http://www.xbrl.org/2003/xbrl-linkbase-
2003-12-31.xsd" xmlns:fj="http://www.fujitsu.com/xbrl/taxeditor/sample">
  <link:roleRef roleURI="http://www.fujitsu.com/BalanceSheet" xlink:type="simple"
xlink:href="sample.xsd#BS"/>
  <link:roleRef roleURI="http://www.fujitsu.com/IncomeStatements" xlink:type="simple"
xlink:href="sample.xsd#PL"/>
   <link:calculationLink xlink:type="extended" xlink:role="http://www.fujitsu.com/BalanceSheet">
     <link:loc xlink:type="locator" xlink:href="sample.xsd#p0_ABC" xlink:label="ABC"
xlink:title="ABC"/>
     <link:loc xlink:type="locator" xlink:href="sample.xsd#p0_A" xlink:label="A" xlink:title="A"/>
     <link:calculationArc xlink:type="arc" xlink:from="ABC" xlink:to="A" order="1.0" weight="1.0"/>
     <link:loc xlink:type="locator" xlink:href="sample.xsd#p0_B" xlink:label="B" xlink:title="B"/>
     <link:calculationArc xlink:type="arc" xlink:from="ABC" xlink:to="B" order="2.0" weight="1.0"/>
     <link:loc xlink:type="locator" xlink:href="sample.xsd#p0_C" xlink:label="C" xlink:title="C"/>
     <link:calculationArc xlink:type="arc" xlink:from="ABC" xlink:to="C" order="3.0" weight="1.0"/>
   </link:calculationLink>
   <link:calculationLink xlink:type="extended"
xlink:role="http://www.fujitsu.com/IncomeStatements">

・・・ INCOME STATEMENT IS DEFINED IN SIMILAR WAY ・・・

</link:calculationLink>

・・・ BY THESE REPRESENTATION, CONSOLIDATED BALANCE SHEET (CURRENT FISCAL YEAR),
CONSOLIDATED INCOME STATEMENT (CURRENT FISCAL YEAR), CONSOLIDATED CASH FLOW
STATEMENT (CURRENT FISCAL YEAR),CONSOLIDATED BALANCE SHEET (PREVIOUS FISCAL YEAR),
CONSOLIDATED INCOME STATEMENT (PREVIOUS FISCAL YEAR), CONSOLIDATED CASH FLOW
STATEMENT (PREVIOUS FISCAL YEAR),NON-CONSOLIDATED BALANCE SHEET (CURRENT FISCAL
YEAR), NON-CONSOLIDATED INCOME STATEMENT (CURRENT FISCAL YEAR), NON-CONSOLIDATED
CASH FLOW STATEMENT (CURRENT FISCAL YEAR),NON-CONSOLIDATED BALANCE SHEET (PREVIOUS
FISCAL YEAR), NON-CONSOLIDATED INCOME STATEMENT (PREVIOUS FISCAL YEAR), NON-
CONSOLIDATED CASH FLOW STATEMENT (PREVIOUS FISCAL YEAR), ETC.
     ARE DESCRIBED AS NEEDED. EACH FINANCIAL STATEMENT IS DISTINGUISHED BY role ATTRIBUTE
OF presentationLink ELEMENT AND REPRESENTED AS DIFFERENT TREE STRUCTURE.  ・・・

</link:linkbase>
```

FIG. 5

(A)
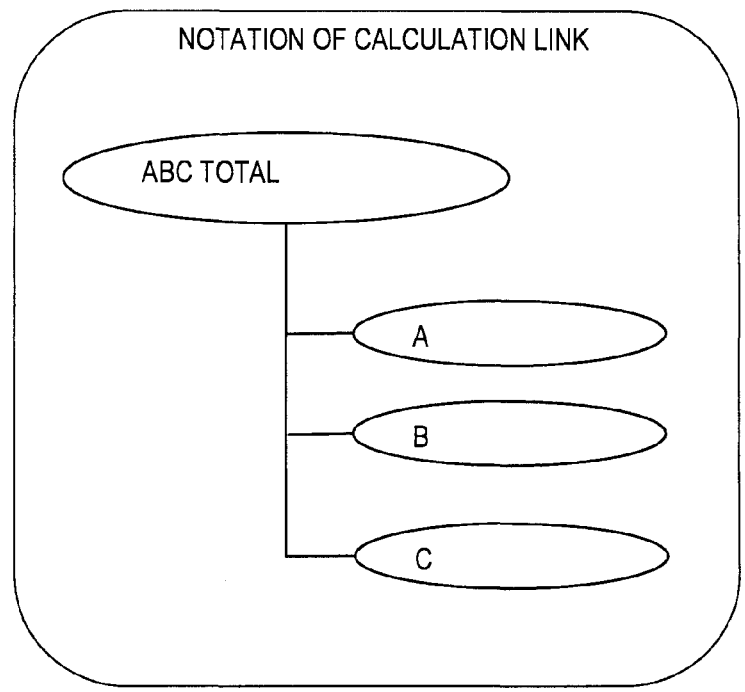
(B)
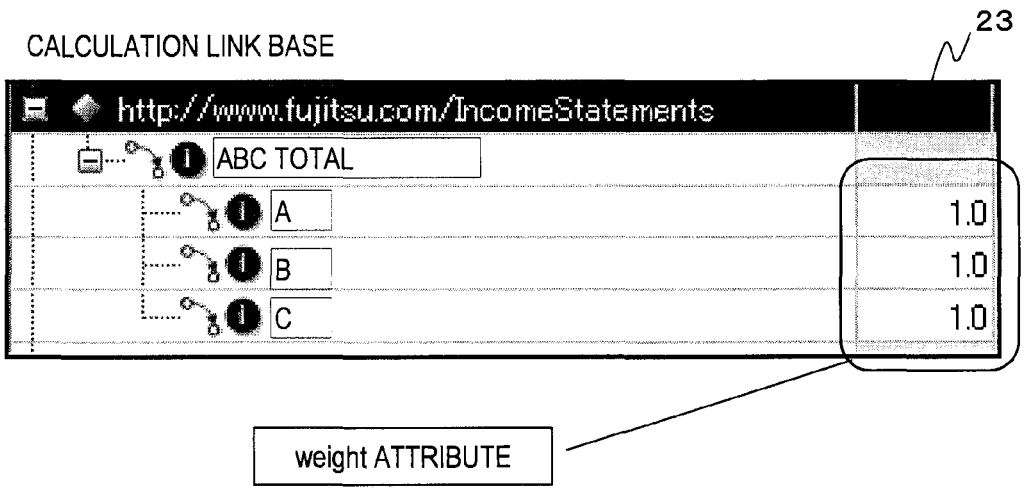
FIG. 6

```xml
<?xml version="1.0" encoding="UTF-8"?>
<link:linkbase xmlns:link="http://www.xbrl.org/2003/linkbase"
 xmlns:xbrli="http://www.xbrl.org/2003/instance" xmlns:xlink="http://www.w3.org/1999/xlink"
 xmlns:xsi="http://www.w3.org/2001/XMLSchema-instance"
 xsi:schemaLocation="http://www.xbrl.org/2003/linkbase http://www.xbrl.org/2003/xbrl-linkbase-
2003-12-31.xsd" xmlns:fj="http://www.fujitsu.com/xbrl/taxeditor/sample">
  <link:labelLink xlink:type="extended" xlink:role="http://www.xbrl.org/2003/role/link">
    <link:loc xlink:type="locator" xlink:href="sample.xsd#p0_A" xlink:label="A" xlink:title="A"/>
    <link:label xlink:type="resource" xlink:label="label_A" xlink:title="label_A" xml:lang="ja"
 id="label_A">A</link:label>
    <link:labelArc xlink:type="arc"  xlink:from="A" xlink:to="label_A" />
    <link:label xlink:type="resource" xlink:label="label_A_2" xlink:title="label_A" xml:lang="en"
 id="label_A_2">a</link:label>
    <link:labelArc xlink:type="arc"  xlink:from="A" xlink:to="label_A_2" />
    <link:loc xlink:type="locator" xlink:href="sample.xsd#p0_B" xlink:label="B" xlink:title="B"/>
    <link:label xlink:type="resource" xlink:label="label_B" xlink:title="label_B" xml:lang="ja"
 id="label_B">B</link:label>
    <link:labelArc xlink:type="arc"  xlink:from="B" xlink:to="label_B" />
    <link:label xlink:type="resource" xlink:label="label_B_2" xlink:title="label_B" xml:lang="en"
 id="label_B_2">b</link:label>
    <link:labelArc xlink:type="arc"  xlink:from="B" xlink:to="label_B_2" />
    <link:loc xlink:type="locator" xlink:href="sample.xsd#p0_C" xlink:label="C" xlink:title="C"/>
    <link:label xlink:type="resource" xlink:label="label_C" xlink:title="label_C" xml:lang="ja"
 id="label_C">C</link:label>
    <link:labelArc xlink:type="arc"  xlink:from="C" xlink:to="label_C" />
    <link:label xlink:type="resource" xlink:label="label_C_2" xlink:title="label_C" xml:lang="en"
 id="label_C_2">c</link:label>
    <link:labelArc xlink:type="arc"  xlink:from="C" xlink:to="label_C_2" />
    <link:loc xlink:type="locator" xlink:href="sample.xsd#p0_ABC" xlink:label="ABC"
 xlink:title="ABC"/>
    <link:label xlink:type="resource" xlink:label="label_ABC" xlink:title="label_ABC" xml:lang="ja"
 id="label_ABC">ABC TOTAL</link:label>
    <link:labelArc xlink:type="arc" xlink:from="ABC" xlink:to="label_ABC" />
    <link:label xlink:type="resource" xlink:label="label_ABC_3" xlink:title="label_ABC"
 xml:lang="en" id="label_ABC_3">Total abc</link:label>
    <link:labelArc xlink:type="arc" xlink:from="ABC" xlink:to="label_ABC_3" />
    <link:loc xlink:type="locator" xlink:href="sample.xsd#p0_ABC_Title" xlink:label="ABC_Title"
 xlink:title="ABC_Title"/>
    <link:label xlink:type="resource" xlink:label="label_ABC_Title" xlink:title="label_ABC_Title"
 xml:lang="ja" id="label_ABC_Title">ABC TITLE</link:label>
    <link:labelArc xlink:type="arc" xlink:from="ABC_Title" xlink:to="label_ABC_Title"
 xlink:title="label: ABC_Title to label_ABC_Title"/>
    <link:label xlink:type="resource" xlink:label="label_ABC_Title_2" xlink:title="label_ABC_Title"
 xml:lang="en" id="label_ABC_Title_2">Title abc</link:label>
    <link:labelArc xlink:type="arc" xlink:from="ABC_Title" xlink:to="label_ABC_Title_2"/>

··· DEFINED FOR OTHER ELEMENT IN SIMILAR WAY ···

</link:linkbase>
```

FIG. 7

```xml
<?xml version="1.0" encoding="UTF-8"?>
<xbrli:xbrl xmlns:xbrli="http://www.xbrl.org/2003/instance"
 xmlns:link="http://www.xbrl.org/2003/linkbase" xmlns:xlink="http://www.w3.org/1999/xlink"
 xmlns:fj="http://www.fujitsu.com/xbrl/taxeditor/sample"
 xmlns:iso4217="http://www.xbrl.org/2003/iso4217">
  <link:schemaRef xlink:type="simple" xlink:href="sample.xsd"/>
  <xbrli:context id="Context2006Duration">
    <xbrli:entity>    <xbrli:identifier scheme="http://www.fujitsu.com">9999</xbrli:identifier>
    </xbrli:entity>
    <xbrli:period>    <xbrli:startDate>2006-04-01</xbrli:startDate>
                      <xbrli:endDate>2007-03-31</xbrli:endDate>
    </xbrli:period>
  </xbrli:context>
  <xbrli:context id="Context2006Instant">
    <xbrli:entity>    <xbrli:identifier scheme="http://www.fujitsu.com">9999</xbrli:identifier>
    </xbrli:entity>
    <xbrli:period>    <xbrli:instant>2007-03-31</xbrli:instant>    </xbrli:period>
  </xbrli:context>
  <xbrli:context id="Context2005Duration">
    <xbrli:entity>    <xbrli:identifier scheme="http://www.fujitsu.com">9999</xbrli:identifier>
    </xbrli:entity>
    <xbrli:period>    <xbrli:startDate>2005-04-01</xbrli:startDate>
                      <xbrli:endDate>2006-03-31</xbrli:endDate>
    </xbrli:period>
  </xbrli:context>
  <xbrli:context id="Context2005Instant">
    <xbrli:entity>    <xbrli:identifier scheme="http://www.fujitsu.com">9999</xbrli:identifier>
    </xbrli:entity>
    <xbrli:period>    <xbrli:instant>2006-03-31</xbrli:instant>    </xbrli:period>
  </xbrli:context>
  <xbrli:unit id="JPY">   <xbrli:measure>iso4217:JPY</xbrli:measure>   </xbrli:unit>
  <fj:A decimals="0" contextRef="Context2006Instant" unitRef="JPY">100</fj:A>
  <fj:B decimals="0" contextRef="Context2006Instant" unitRef="JPY">200</fj:B>
  <fj:C decimals="0" contextRef="Context2006Instant" unitRef="JPY">300</fj:C>
  <fj:ABC decimals="0" contextRef="Context2006Instant" unitRef="JPY">600</fj:ABC>
  <fj:A decimals="0" contextRef="Context2005Instant" unitRef="JPY">110</fj:A>
  <fj:B decimals="0" contextRef="Context2005Instant" unitRef="JPY">210</fj:B>
  <fj:C decimals="0" contextRef="Context2005Instant" unitRef="JPY">310</fj:C>
  <fj:ABC decimals="0" contextRef="Context2005Instant" unitRef="JPY">630</fj:ABC>
  <fj:X decimals="0" contextRef="Context2006Duration" unitRef="JPY">900</fj:X>
  <fj:Y decimals="0" contextRef="Context2006Duration" unitRef="JPY">800</fj:Y>
  <fj:Z decimals="0" contextRef="Context2006Duration" unitRef="JPY">700</fj:Z>
  <fj:XYZ decimals="0" contextRef="Context2006Duration" unitRef="JPY">2400</fj:XYZ>
  <fj:X decimals="0" contextRef="Context2005Duration" unitRef="JPY">910</fj:X>
  <fj:Y decimals="0" contextRef="Context2005Duration" unitRef="JPY">810</fj:Y>
  <fj:Z decimals="0" contextRef="Context2005Duration" unitRef="JPY">710</fj:Z>
  <fj:XYZ decimals="0" contextRef="Context2005Duration" unitRef="JPY">2430</fj:XYZ>
</xbrli:xbrl>
```

FIG. 8

| Element Label | Context2006Duration Value | Context2006Instant Value | Context2005Duration Value | Context2005Instant Value |
|---|---|---|---|---|
| fjABC_Title | | | | |
| fjA | | 100 | | 110 |
| fjB | | 200 | | 210 |
| fjC | | 300 | | 310 |
| fjABC | | 600 | | 630 |
| fjXYZ_Title | | | | |
| fjX | 900 | | 910 | |
| fjY | 800 | | 810 | |
| fjZ | 700 | | 710 | |
| fjXYZ | 2,400 | | 2,430 | |

FIG. 9

|            | 2006  | 2005  |
|------------|-------|-------|
| ABC TITLE  |       |       |
| A          | 100   | 110   |
| B          | 200   | 210   |
| C          | 300   | 310   |
| ABC TOTAL  | 600   | 630   |
| XYZ TITLE  |       |       |
| X          | 900   | 910   |
| Y          | 800   | 810   |
| Z          | 700   | 710   |
| XYZ TOTAL  | 2,400 | 2,430 |

| ERROR EVENT | EXTENDED LINK ROLE NAME | PARENT ELEMENT NAME | ELEMENT NAME | CONTEXT | INPUT VALUE | INFERRED ERROR |
|---|---|---|---|---|---|---|
| TOO FEW ELEMENTS IN A CALCULATION LINK | BalanceSheet | X | A | Context2005 | 100 | A WHICH MAY BE NECESSARY AS A CHILD ELEMENT OF X IS NOT SET IN A CALCULATION LINK. |
| TOO MANY ELEMENTS IN A CALCULATION LINK | BalanceSheet | Y | B | Context2005 | 200 | B WHICH MAY NOT BE NECESSARY AS A CHILD ELEMENT OF Y IS SET IN A CALCULATION LINK. |
| CONTEXT ERROR | IncomeStatements | Z | C | Context2006 | 300 | A VALUE MAY BE INPUT TO AN ELEMENT NAME C IN A WRONG CONTEXT. |
| | | | | ... | | |

FIG. 17

DOCUMENT ERROR INFERENCE PROCESSING PROGRAM, PROCESSING DEVICE AND PROCESSING METHOD

CROSS-REFERENCE TO RELATED APPLICATION

This application is based upon and claims the benefit of priority of the prior PCT international application PCT/JP2006/319674 filed on Oct. 2, 2006 in Japan, the entire contents of which are incorporated herein by reference.

FIELD

The embodiment discussed herein is related to a processing technology for a document in which one or more item elements are described in a tagged structured language. More particularly, the present invention relates to a process of inferring an error which causes a discrepancy of item elements between documents that are described in a tagged structured language specification or regulation, for example, XBRL (eXtensible Business Reporting Language).

BACKGROUND

XBRL means an XML (eXtensible Markup Language)-based language to describe financial or accounting information (hereinafter referred to as financial information) used for a variety of purposes such as finance, management and investment. XBRL is suitable for describing financial information such as a financial statement and an internal accounting report.

In XBRL, a whole picture of concepts of finance or accounting can be defined by using a taxonomy schema and a link base. The taxonomy schema (a taxonomy body) defines each financial and accounting concept (such as "sales" and "cost of sales") as a constituent element. The link base (link information) is information of links between constituent elements, which are defined in each process such as a display process and an arithmetic process. The taxonomy schema and the link base are together called a taxonomy specification.

Based on the taxonomy specification, an instance document is created. An instance document includes at least one or more contexts in which an actual input value is set to each of item elements. With the instance document, predetermined financial information is handled.

XBRL is standardized by the XBRL International, an international organization.

An XBRL document processing system that handles financial information will be described with reference to FIG. 24. The XBRL document processing system comprises an XBRL document processing device 1 for creating, editing, displaying, and printing a financial reporting document based on an XBRL specification document (hereinafter refer to an XBRL document), an XBRL document memory unit 2 for storing the XBRL document, and an output device 3 for outputting the financial reporting document so as to display or print it.

In the XBRL document memory unit 2, a taxonomy schema 21, a display link base 22, a calculation link base 23, a definition link base 24, a label link base 25, a reference link base 26, and an instance 28 are stored as an XBRL document for describing financial information.

The taxonomy schema 21 is a body of the taxonomy specification, which includes definition information of vocabulary (such as an element name and an attribute of an item) to be used in the instance 28 for describing financial information. Specifically, names and attributes of item elements, used in the instance 28, such as an account title of financial information, are defined.

The display link base 22 is setting information such as a hierarchical relationship and display order of item elements of the instance 28, which information is used in a display process.

The calculation link base 23 is setting information such as a hierarchical relationship, reference relationship, and data check of item elements of the instance 28, which information is used in an aggregation process.

The definition link base 24 is information representing logical relationships between item elements of the instance 28 such as a hierarchical relationship (a parent and child relationship).

The label link base 25 is label information presenting names of item elements in the instance 28. The label information accommodates multiple languages such as Japanese and English. Also, the label link base 25 may include instruction information or the like, which is used during inputting data or creating an instance.

The reference link base 26 is reference information such as basis articles, related regulations, and handling information of item elements of the instance 28.

The instance 28 is an XML document including a context, in which item elements and input values thereof required as a financial reporting document are described based on the taxonomy schema 21.

As predetermined financial information, the XBRL document processing device 1 creates and saves the instance 28 based on the taxonomy schema 21. Also, the XBRL document processing device 1 loads the instance 28 from the XBRL document memory unit 2 then outputs (displays or prints) the content of the instance 28 to the output device 3 based on the setting information of the display link base 22.

The XBRL document defines items that are concepts of financial information by the taxonomy schema 21. The XBRL document also defines hierarchical relationships and reference relationships between the items in displaying and calculating the financial information as the link bases 22 to 26, to handle financial statements.

The XBRL document processing device 1 can create and edit the taxonomy schema 21 and the link bases 22 to 26 separately. Also, actual data of financial information is provided to the instance 28 as input values in the XBRL document processing device 1. This allows financial information to be output as a reporting document in a variety of formats and the data to be reused.

However, since the link bases 22 to 26 and the instance 28 are handled separately, mutual relationships of item elements may be discrepant. For example, the calculation result calculated based on the settings of the calculation link base 23 and the input value set to the corresponding item in the instance 28 may not be consistent.

Traditionally, if such a discrepancy occurred, a human manually performed a cross-check operation between the output result of the instance 28 and the calculation link base 23 to detect the cause of the discrepancy.

However, in the instance 28 based on the XBRL document, only the required item elements and the input values thereof are set, and information representing a hierarchical relationship between the item elements is not set.

Furthermore, there is not necessarily correspondent between the item names of the item elements or the hierarchical relationship of the item elements when an instance document is output (displayed or printed) and the hierarchical relationship of the item elements when each of input values to the item elements of the instance document is arithmetically processed. That is, since a display rule base representing a configuration of the item elements in a display process and a calculation rule base representing a configuration of the item elements in an arithmetic process includes a hierarchical structure of the item element in their own process, the item elements are never directly correlated between the two rule bases. Therefore, a large amount of effort has been spent in a process of detecting a consistency of setting information of item elements between an instance document and a calculation rule base.

The present invention provides a processing device, a processing method and a program thereof, for a document in which item elements are described in a tagged structured language such as XBRL, for detecting a discrepancy between input values set to entity data created based on the definition information of the item elements and processing results based on the separately set link information between each of the item elements, then displaying an inference result of an error that caused the discrepancy.

The present invention is a document error inference processing program that enables a computer comprising a document data memory unit that memorizes, a taxonomy schema in which an item element is defined with a tagged structured language, an instance document which includes a context in which an input value is stored in the item element defined in the taxonomy schema, a display link base which includes a hierarchical structure of the item elements of the instance document in display processing, and a calculation link base which includes a reference relationship and a hierarchical structure of the item elements of the instance document in arithmetic processing to perform: 1) a discrepancy detecting process that calculates an input value of the item element of the instance document based on the hierarchical structure of the calculation link base, compares the calculated value and an input value of the instance document corresponding to the item element of the calculated value based on the hierarchical structure of the display link base, and detects a discrepancy between the calculated value and the input value; and 2) an error inference process that specifies a calculation tree structure of the calculation link base in which the item element of the calculated value in which the discrepancy is detected is set, specifies a display tree structure of the display link base in which the item element of the input value in which the discrepancy is detected is set, compares the item elements themselves set in each of the calculation tree structure and the display tree structure, and infers an excess or deficiency of an item element which is set only in either the calculation tree structure or the display tree structure and has an input value which is consistent with an absolute value of the difference between the input value and the calculated value as an error of the discrepancy if such an item element exists.

In accordance with the present invention, the computer works as follows.

First, an input value of an item element of an instance document is calculated based on a hierarchical structure of the calculation link base memorized in the document data memory unit. An input value of the instance document corresponding to the item element of the calculated value is then retrieved based on a hierarchical structure of the display link base, and the calculated value and the input value are compared. If the calculated value and the input value are not consistent, a discrepancy is detected.

Based on the calculation link base, a calculation tree structure in which the item element of the calculated value in which the discrepancy is detected is set is specified. Also, based on the display link base, a display tree structure in which the item element of the input value in which the discrepancy is detected is set is specified. Item elements set in each of the calculation tree structure and the display tree structure are then compared themselves. If an item element of the instance document which is set only in either the calculation tree structure or the display tree structure and has an input value which is consistent with an absolute value of the difference between the input value and the calculated value exists, an excess or deficiency of such an item element is inferred as an error of the discrepancy.

Then, as an error inference result of the error inference processing, information about the item element inferred as an error is output.

Moreover, the present invention is a processing device for performing the above described process with each of processing means. Also, the present invention is a processing method in which a computer performs the above described process in each of processing steps.

The program of the present invention can be stored in an appropriate computer-readable recording media such as a portable medium memory, a semiconductor memory, and a hard disk. Also, the program of the present invention is provided by being recorded in the recording media, or provided by transmission and reception that use a variety of communication networks via communication interfaces.

An input value of an item element of an instance document of an XBRL document and an arithmetic processing result based on settings of a calculation link base must be consistent, and the consistency thus needs to be validated.

According to the present invention, a cause that made a calculated result of a calculation link base constituting an XBRL document and an input value of an instance document different can be automatically inferred and displayed to a user.

This allows great reduction of work load for a validation process of a calculation link base and an inference process of an error that causes a discrepancy, which have been traditionally performed by manpower.

Thus, since even a person other than an XBRL specialist can easily detect a flaw of an XBRL document, work load of creating financial information of each company or the like in XBRL can be reduced.

The object and advantage of the invention will be realized and attained by means of the elements and combination particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2 is a diagram illustrating an example of a taxonomy schema;

FIG. 3 is a diagram illustrating an example of a display link base;

FIGS. 4A and 4B are diagrams illustrating a relationship and a display example of item elements defined in a display link base;

FIG. 5 is a diagram illustrating an example of a calculation link base;

FIGS. 6A and 6B are diagrams illustrating a relationship and a display example of item elements defined in a calculation link base;

FIG. 7 is a diagram illustrating an example of a label link base;

FIG. 8 is a diagram illustrating an example of an instance;

FIG. 9 is a diagram illustrating examples of input values of elements of an instance;

FIG. 10 is a diagram illustrating an output example of an instance;

FIG. 13 is a diagram for describing a second inference logic;

FIG. 17 is a diagram illustrating a display example of an error inference list;

DESCRIPTION OF EMBODIMENT

The best mode for carrying out the present invention will be described using the following embodiment.

In the present embodiment, a document error inference processing device of the present invention validates a discrepancy between accounting items (item elements) described in an instance document and a calculation link base representing details of a aggregation process of the accounting items, infers an error that caused the discrepancy, and output the position and content of the error if an XBRL document of a financial report is created and saved.

Figure 1:
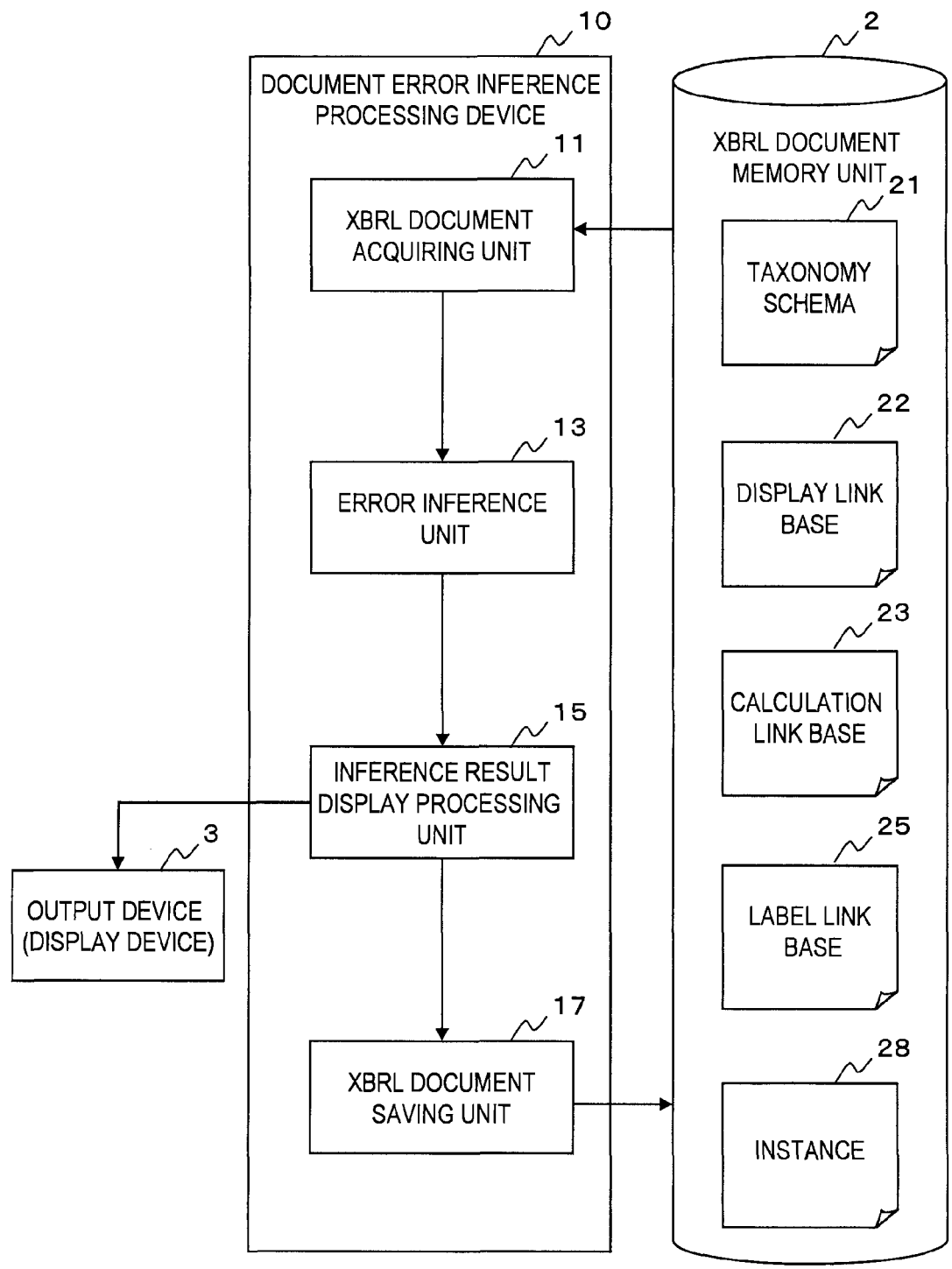
FIG. 1 is a diagram illustrating a configuration example in an embodiment of the present invention.

FIG. 1 illustrates a configuration example in the embodiment of the present invention. A document error inference processing device 10 comprises an XBRL document acquiring unit 11, an error inference unit 13, an inference result display processing unit 15, an XBRL document saving unit 17, an XBRL document memory unit 2, and an output device 3.

Figure 24:
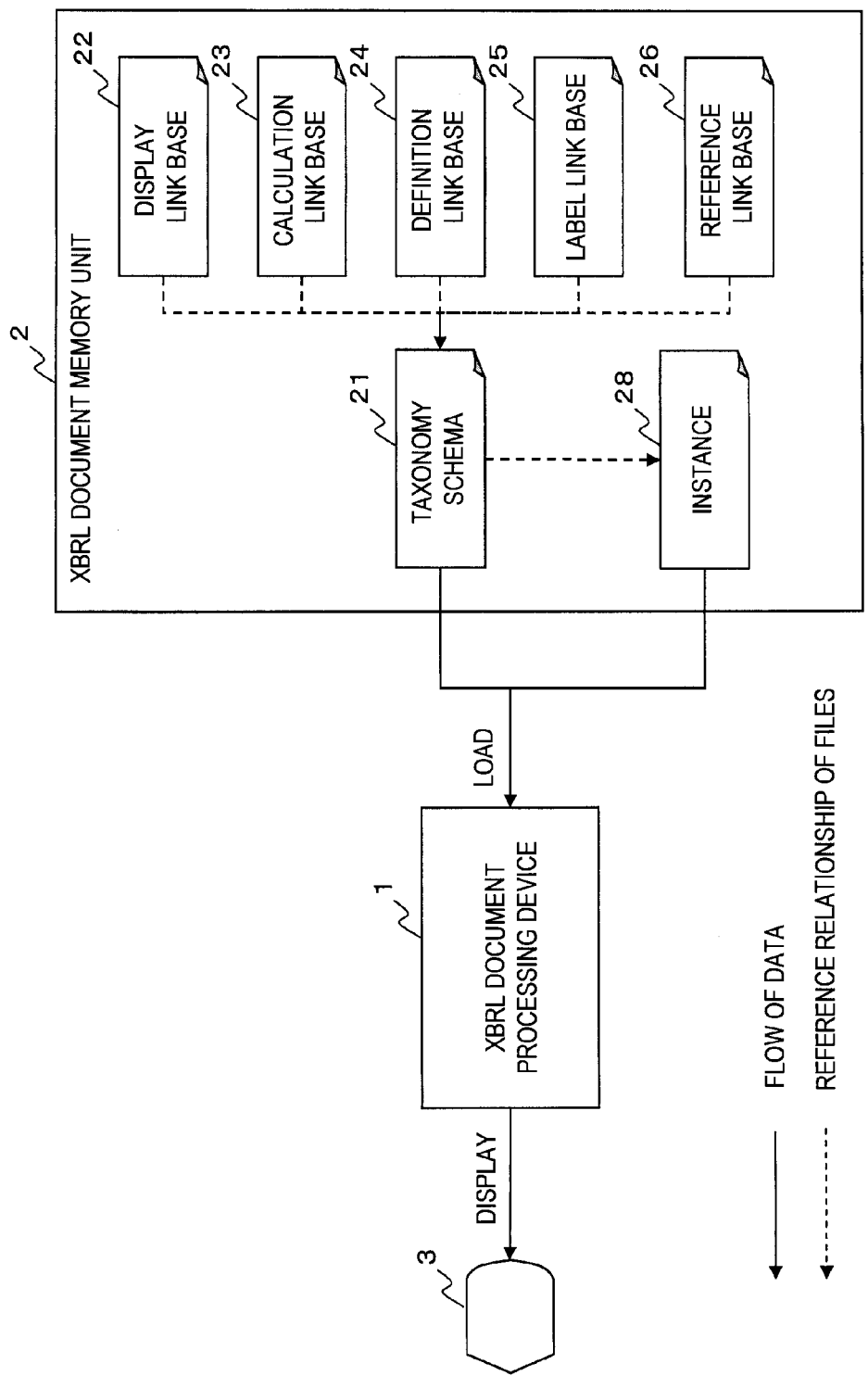
FIG. 24 is a diagram illustrating an example of an XBRL document processing system.

In the present embodiment, the document error inference processing device 10 is configured in an interior of the XBRL document processing device 1 illustrated in FIG. 24. The document error inference processing device 10 is configured separately from the XBRL document processing device 1 illustrated in FIG. 24, and may cooperate with an XBRL document processing system.

The XBRL document memory unit 2 is memory means that memorizes the taxonomy schema 21, the display link base 22, the calculation link base 23, the label link base 25, and the instance 28.

The taxonomy schema 21 is information that defines elements representing accounting items used in the instance 28 for describing financial information such as a financial report and attributes of the elements such as an element name, an identification value, a rental account, term, and abstraction.

FIG. 2 illustrates an example of the taxonomy schema 21. In a 'sample.xsd' of the taxonomy schema 21, an 'element' element that represents an accounting item has an attribute such as 'name', 'type', 'id', 'balance', 'periodType' and 'abstract'. Also, reference information to other link base is described. Also, other taxonomy schema, definition information of an XBRL-compatible schema, etc. are described with an 'import' statement.

The display link base 22 is information in which a hierarchical relationship, a display order, etc. for displaying or printing (hereinafter referred to as just displaying) the accounting items of the instance 28 are set.

FIG. 3 illustrates an example of the link base 22. In a 'sample-presentation.xml' of the display link base 22, a 'link' element has an attribute such as 'type', 'href', 'label' and 'title' as an attribute that represents a display content, and an attribute such as 'arc', 'from', 'to' and 'order' as a 'presentationArc' attribute that represents a configuration of items when displayed.

A display format of each financial statement is distinguished by a 'role' attribute of a 'presentationLink7 element and described as a different tree structure. Also, setting information of a balance sheet, an income statement, a cash flow statement, etc. is described per fiscal year such as a current fiscal year and a previous fiscal year, per consolidation or non-consolidation, etc. as needed.

FIG. 4A is a diagram illustrating a relationship of some elements defined in the display link base 22. In FIG. 4A, an oval represents an element, a straight line connecting ovals represents an 'arc', and a string in an oval represents a label. The relationship illustrated in FIG. 4A means that an element "ABC_Title" references elements "A", "B", "C" and "ABC" in this order. The elements "ABC_Title", "A", "B", "C" and "ABC" are labeled as "ABC Title", "A", "B", "C" and "ABC", respectively. An 'abstract' attribute of the element "ABC_Title" is "true", and an 'abstract' attribute of other elements is "false".

FIG. 4B is a diagram illustrating an example when the display link base 22 illustrated in FIG. 4A is displayed on the output device 3.

The calculation link base 23 is information in which a reference relationship, a hierarchical structure, an aggregation content (adding and subtracting operations), data check, etc. between elements used for aggregation of accounting items of the instance 28 are set.

FIG. 5 illustrates an example of the calculation link base 23. In a "sample-calculation.xml" of the calculation link base 23, a 'link' element has an attribute such as 'type', 'href', 'label' and 'title' as a 'loc' attribute and an attribute such as 'arc', 'from', 'to', 'order' and 'weight' as a 'calculationArc' attribute that represents a reference relationship and a content in an arithmetic operation.

An aggregation content of each financial statement is distinguished by a "role" attribute of 'calculationLink' element, and each of these contents is described as a different tree structure.

FIG. 6A is a diagram illustrating a relationship between some elements defined in the calculation link base 23. In FIG. 6A, an oval represents an element, a straight line connecting ovals represents an 'arc', and a string in an oval represents a label. The relationship illustrated in FIG. 6A means that an element "ABC" references elements "A", "B" and "C" in this order with a weight attribute="1" and adds up a value of each element. A weight attribute="1" means that a value of the referenced element is added after being multiplied by 1.0. Thus, an arithmetic operation such as the following is performed.

$$ABC=A*1.0+B*1.0+C*1.0$$

The elements "ABC", "A", "B" and "C" are labeled as "ABC Total", "A", "B" and "C", respectively. FIG. 6B is a diagram illustrating an example when the calculation link base 23 illustrated in FIG. 6A is displayed on the output device 3.

The label link base 25 is display label information of accounting items of the instance 28.

FIG. 7 illustrates an example of the label link base 25. The label link base 25 describes display label names (accounting item names) used when displaying elements of the display link base 22. As illustrated in FIGS. 4B and 6B, the elements "ABC_Title", "A", "B", "C" and "ABC" are displayed or printed using the set display labels.

The instance 28 is an XML document created by referencing definition information in the taxonomy schema 21, in which accounting items and input values thereof needed for a financial report are described.

FIG. 8 illustrates an example of the instance 28. In the instance 28, a unit of a value, a value, etc. are described for each element on a context basis. A context is generally used for distinguishing a fiscal year, and the instance 28 can include a plurality of contexts.

FIG. 9 illustrates examples of input values set to elements in the contexts of instant and duration of fiscal years 2005 and 2006 in the instance 28.

FIG. 10 illustrates an output example of the instance 28. FIG. 10 illustrates a display example displayed in a ledger format according to the settings of the display link base 22 when the instance 28 has the contexts and the input values illustrated in FIG. 9.

Figure 11:
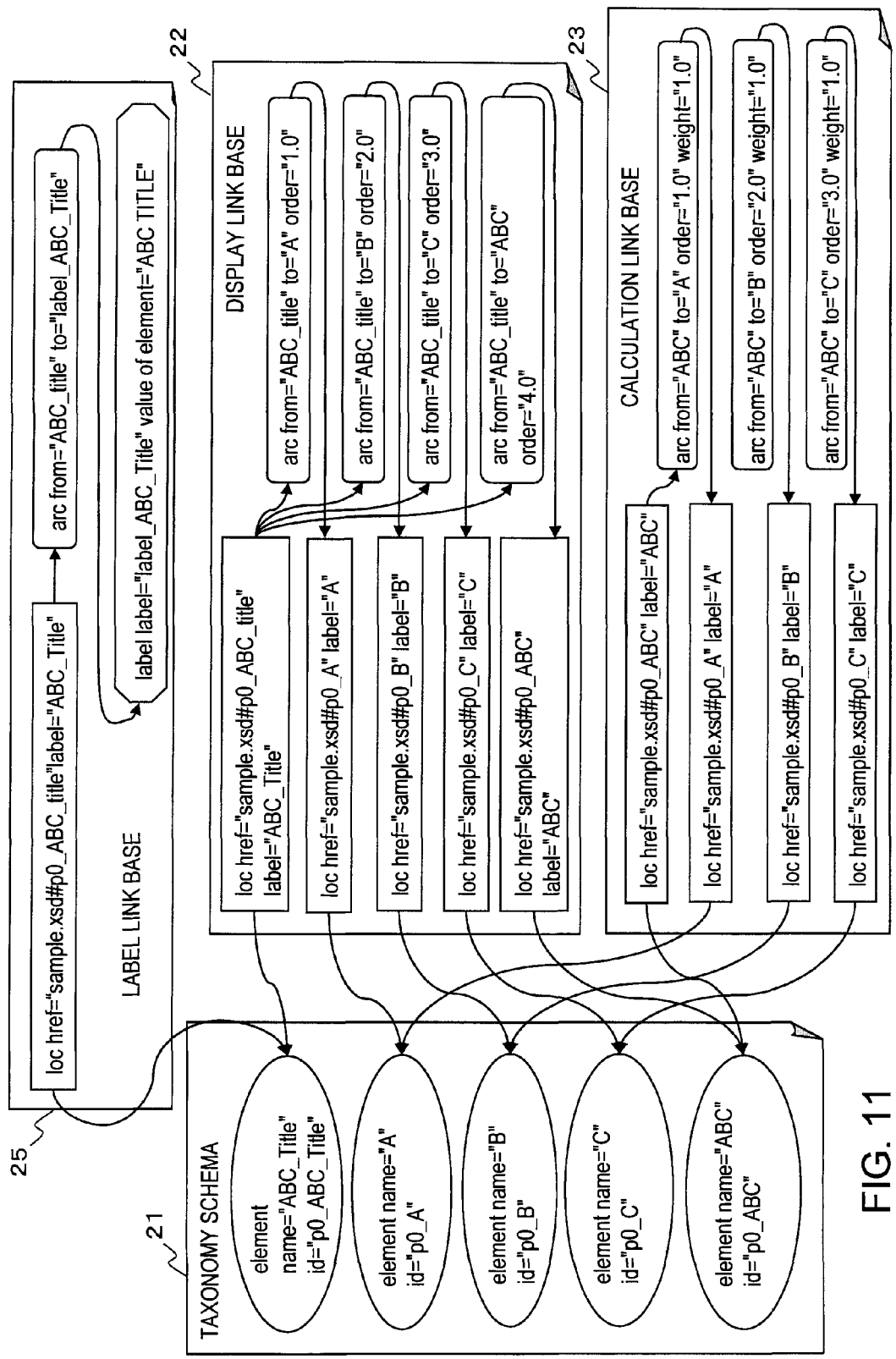
FIG. 11 is a diagram illustrating data structure examples of a taxonomy schema, a display link base, a calculation link base, and a label link base.

FIG. 11 illustrates data structure examples of the taxonomy schema 21, the display link base 22, the calculation link base 23 and the label link base 25. As illustrated in FIG. 11, elements in the display link base 22 and the label link base 25 reference the taxonomy schema 21.

The XBRL document acquiring unit 11 is processing means that acquires necessary data from the XBRL document memory unit 2.

The error inference unit 13 is processing means that performs a discrepancy detecting process that calculates an input value of an element of the instance 28 based on the hierarchical structure of the calculation link base 23, compares the calculated value and an input value of the instance 28 corresponding to the item element of the calculated value based on the hierarchical structure of the display link base 22, and detects a discrepancy between the calculated value and the input value. The error inference unit 13 also performs an error inference process that specifies a calculation tree structure of the calculation link base 23 including information setting the element of the calculated value in which the discrepancy is detected, specifies a display tree structure of the display link base 22 including information setting the item element of the input value in which the discrepancy is detected, compares the item elements themselves set in each of the calculation tree structure and the display tree structure, and infers an excess or deficiency of an item element which is set only in either the calculation tree structure or the display tree structure and has an input value which is consistent with an absolute value of the difference between the input value and the calculated value as an error of the discrepancy if such an item element exists.

The error inference unit 13 infers an element deficiency error in the calculation link base 23 when an element set in a display tree structure does not exist in the calculation tree structure and the difference calculated by subtracting a calculated value form an input value is consistent with the input value of the element of the instance 28 which does not exist in the calculation tree structure.

In contrast, the error inference unit 13 infers an element excess error in the calculation link base 23 when an item element set in the calculation tree structure does not exist in the display tree structure and the difference calculated by subtracting a calculated value form an input value is consistent with a value calculated by inverting a sign of the input value of the element of the instance 28 which does not exist in the display tree structure.

Further, when the instance 28 includes two or more contexts which should be composed of the same set of item elements, and when an element set in the calculation tree structure is set in the first context and has an input value being consistent with the difference calculated by subtracting a calculated value from an input value and the same element having an input value equal to a value calculated by subtracting a calculated value from an input value and inverting a sign is not set in the second context, the error inference unit 13 infers an instance error of that element.

The inference result display processing unit 15 is processing means that outputs an inference result of the error inference unit 13 to the output device 3. The output device 3 is a display device, a printing device or the like.

The XBRL document saving unit 17 is processing means that saves the calculation link base 23 and the instance 28 updated with data input by a user who confirmed the inference result displayed on the output device 3 to the XBRL document memory unit 2.

Inference logics performed in the error inference unit 13 will now be described in more detail.

A First Inference Logic

In a first inference logic, when an element set in the display link base 22 is not set in the corresponding calculation link base 23, it is considered that the element is highly likely failed to be set in the calculation link base 23 and an element deficiency error of the calculation link base 23 is inferred. This enables to infer that an element is missing in the calculation link base 23.

The error inference unit 13 references the taxonomy schema 21 to extract elements set in the display link base 22.

Each of the elements extracted from the display link base 22 is then checked to see whether it is set in the calculation link base 23. When an element extracted from the display link base 22 is not among the elements of the calculation link base 23, that element is added to a first inference result list as an element which is failed to be set. The first inference result list is used in a third inference logic described below.

Figure 12:
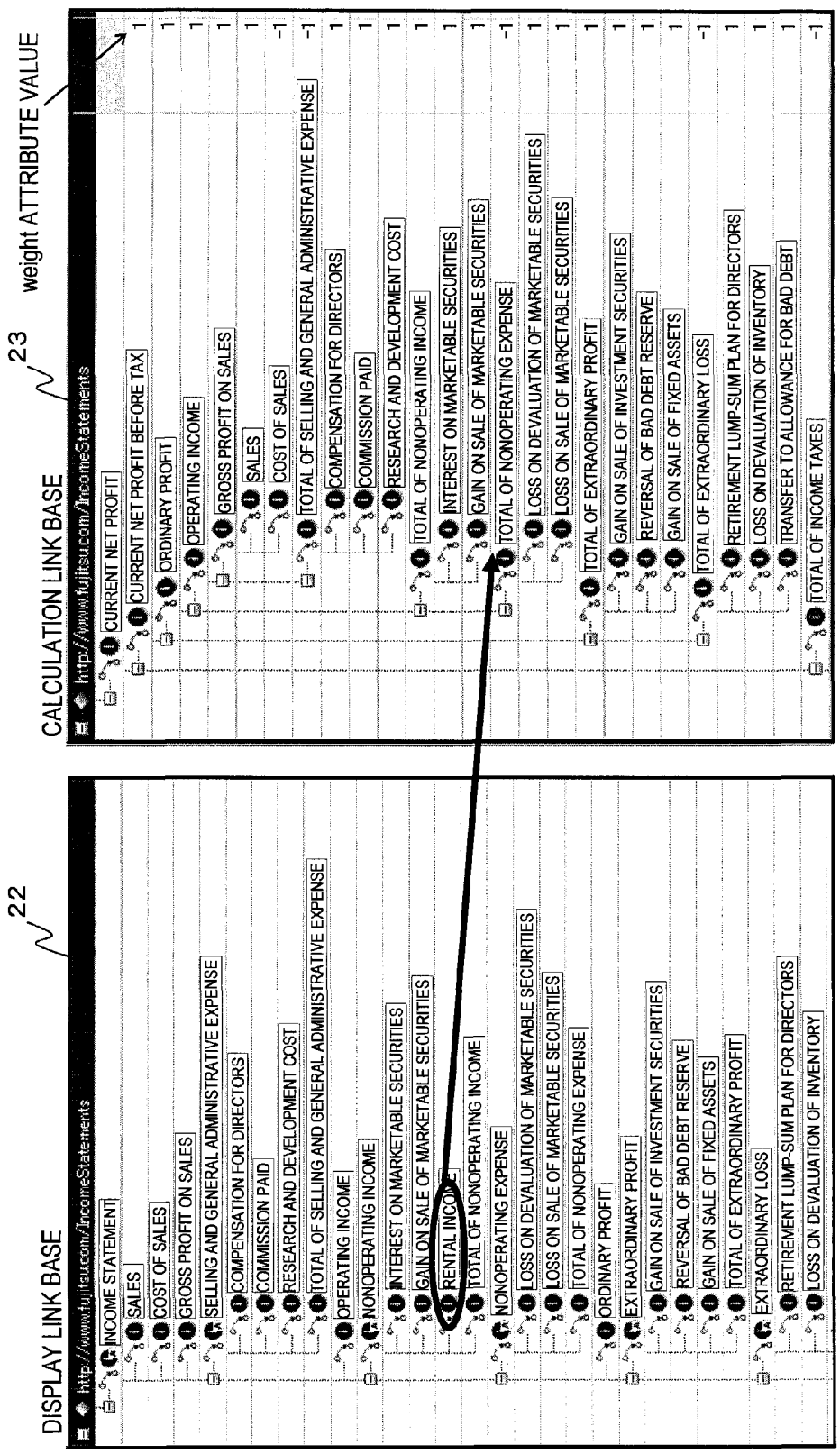
FIG. 12 is a diagram for describing a first inference logic.

Suppose a case in which the display link base 22 and the calculation link base 23 whose contents are stored as illustrated in FIG. 12. The element "rental income" ('abstract'="false") set as a sub element of the element "non-operating income" ('abstract'="true") of the display link base 22 is to be extracted. In the example of the taxonomy schema 21 illustrated in FIG. 2, 'abstract'="false" is omitted. If the element "rental income" ('abstract'="false") is not among the elements of the calculation link base 23, that element "rental income" is added to the first inference result list as "deficiency of elements in a calculation link".

A Second Inference Logic

In a second inference logic, when an element set in the calculation link base 23 is not set in the corresponding display link base 22, it is considered that the element is highly likely set in the calculation link base 23 as a mistake, and an element excess error of the calculation link base 23 is inferred. This enables to infer that an excessive element exists in the calculation link base 23.

The error inference unit 13 references the taxonomy schema 21 to extract elements set in the calculation link base 23.

Each of the elements extracted from the calculation link base 23 is then checked to see whether it is set in the display link base 22. When an element extracted from the calculation link base 23 is not among the elements of the display link base 22, that element is added to a second inference result list as an element excess error. The second inference result list is used in a third inference logic described below.

Figure 13:
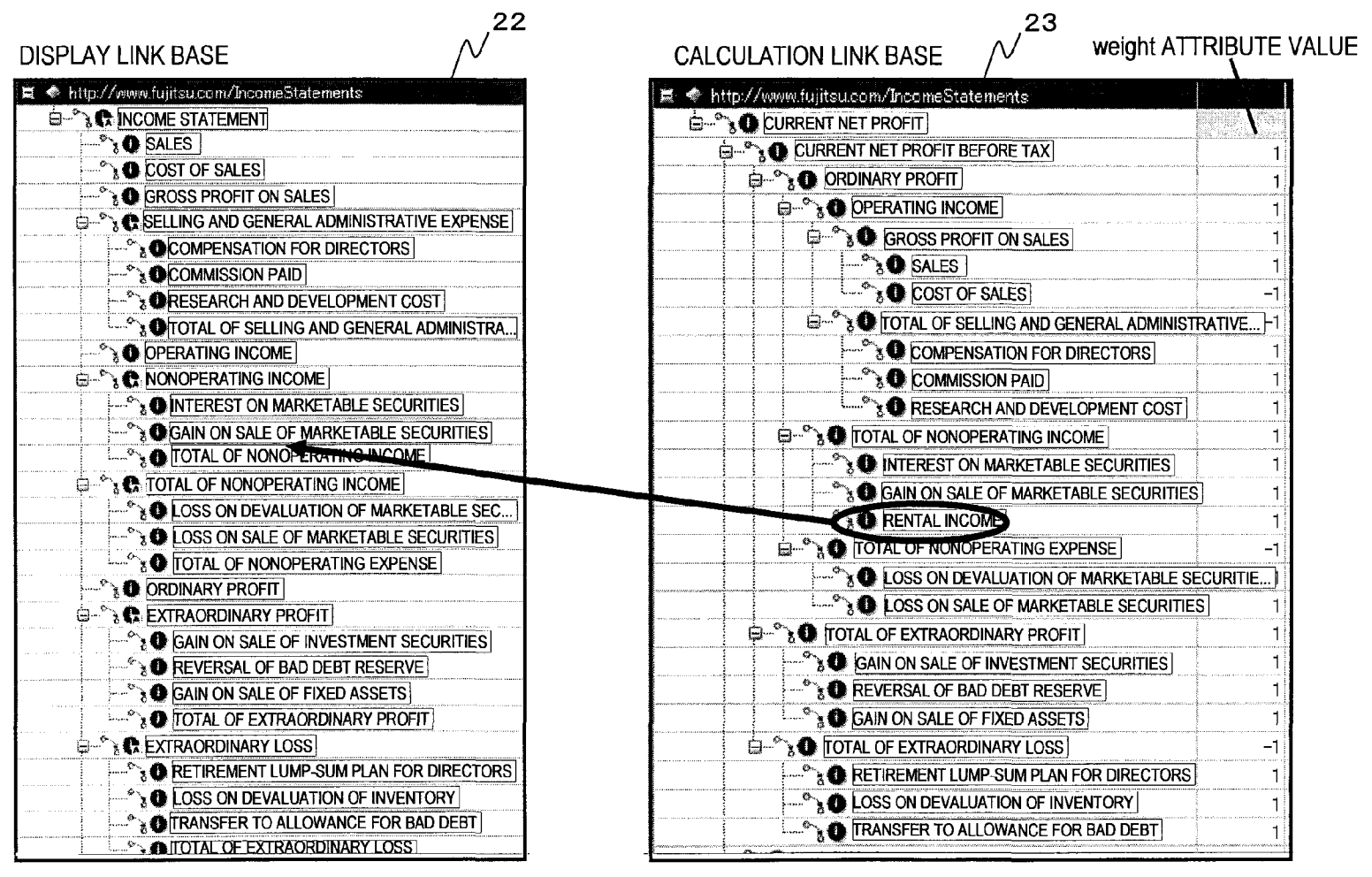

Suppose a case in which the display link base 22 and the calculation link base 23 whose contents are stored as illustrated in FIG. 13. When the element "rental income" ('abstract'="false") set as a sub element of the element "nonoperating income" ('abstract'="true") of the calculation link base 23 is not among the elements of the display link base 22, that element "rental income" is added to the second inference result list as "an excess of elements in a calculation link".

A Third Inference Logic

Because the display link base 22 and the calculation link base 23 for the same instance 28 have different hierarchical structures of elements, it is difficult to directly compare the elements themselves. In a third inference logic, processing results of the first inference logic and the second inference logic are used to infer the position of an element which is missing or excessively set.

The error inference unit 13 performs calculation using an input value of each element of the instance 28 in accordance with the setting information in the calculation link base 23. The result of that calculation is compared to an input value set to a relevant element (an aggregation item) of the instance 28.

If there is an element whose calculated value and input value are not consistent, the element of an input value of the instance 28 to which an input value having the same value as a value (difference) calculated by subtracting the calculated value from the input value is set and whose parent's element name matches, that is, the element set in the corresponding tree structure, is specified.

If the specified element is set in the corresponding tree structure of the calculation link base 23, the first inference result list or the second inference result list is referenced. If the specified element exists either in the first inference result list or the second inference result list, information about that element such as an element name, an element name of the parent, an input value, an event (deficiency of elements or excess of elements in a calculation link base), etc. is added to an error inference list.

Figure 14:
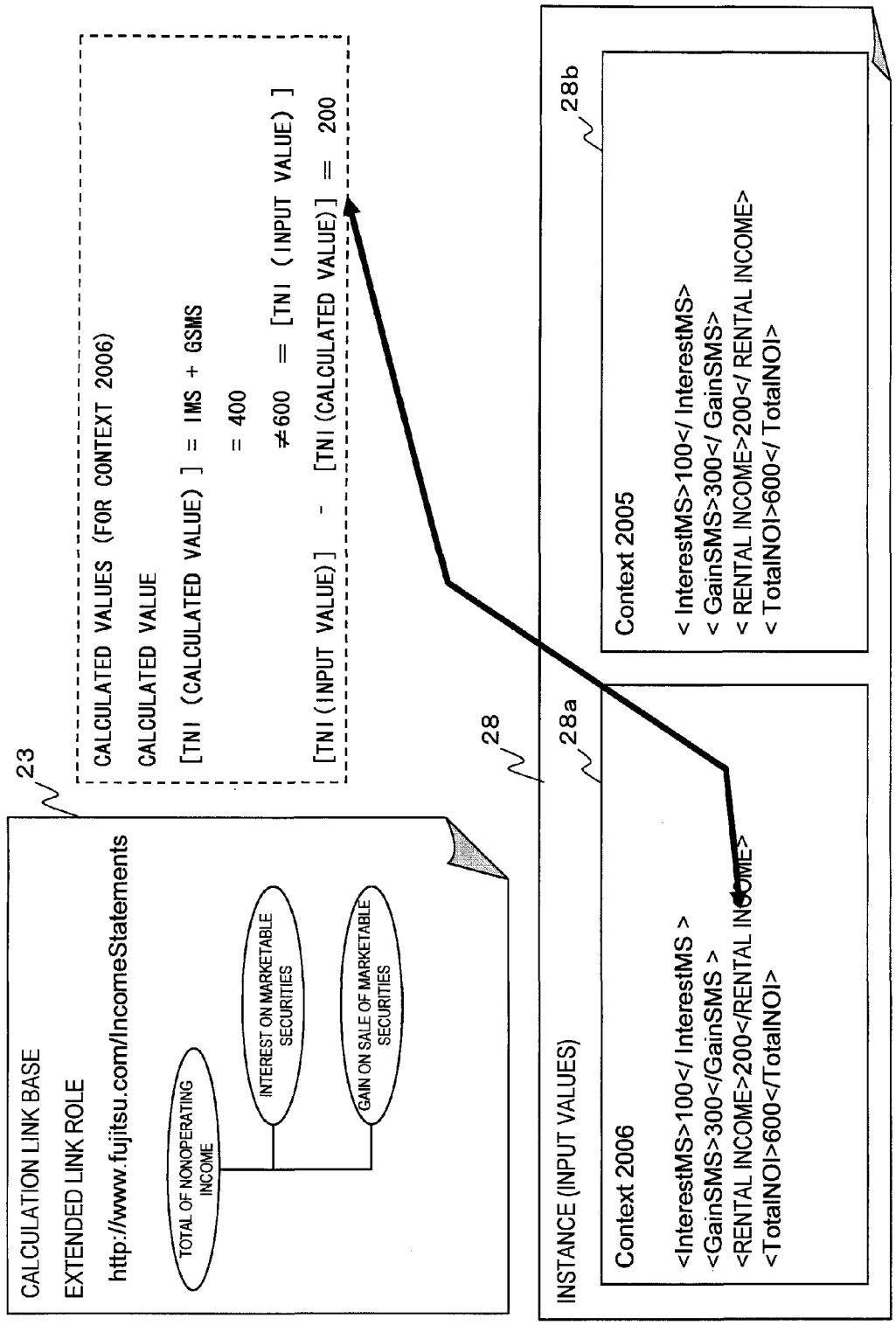
FIG. 14 is a first diagram for describing a third inference logic.

FIG. 14 illustrates a processing example of the third inference logic.

Suppose that four elements, "interest on marketable securities" (input value=100), "gain on sale of marketable securities" (input value=300), "rental income" (input value=200) and "total of nonoperating income" (input value=600), are set in the instance 28. Also, suppose that, in the calculation link base 23, the element "total of nonoperating income" is set to reference the child elements "interest on marketable securities" (weight=1) and "gain on sale of marketable securities" (weight=1).

According to the setting information in the calculation link base 23, an input value of the instance 28 is calculated.

$$\text{calculated value of "total of nonoperating income } (TNI)" = \\ \text{input value 100 of "interest on marketable securities"} * 1.0 + \text{input} \\ \text{value 300 of "gain on sale of marketable securities"} * 1.0 = 400$$

On the other hand, the input value of "total of nonoperating income" is 600. Therefore, the input value (600) is not equal to the calculated value (400), and the difference between them is 200.

Since the input value and the calculated value of the instance 28 do not match, as an element whose parent element is "total of nonoperating income", the elements "interest on marketable securities", "gain on sale of marketable securities" and "rental income" are extracted from the elements set in the instance 28 based on the display link base 22. Also, as an element whose input value is equal to the difference between the calculated value and the input value, the element "rental income" is specified.

Also, it is checked whether the element "rental income" is set in the tree structure of the calculation link base 23 used for calculating the input value.

If the specified element is not set in the relevant tree structure, the first inference result list is referenced. The setting information of the display link base 22 and the calculation link base 23 were already compared, and the element "rental income" of the calculation link base 23 was added to the first inference result list. Thus, the extracted element "rental income" exists in the first inference result list, and it is therefore inferred that the missing of this element is an error. Information such as the element "rental income", the parent element ("total of nonoperating income"), the context ("Context2006"), the input value (200), and the event (deficiency of elements in a calculation link base) is then added to the error inference list.

Figure 15:
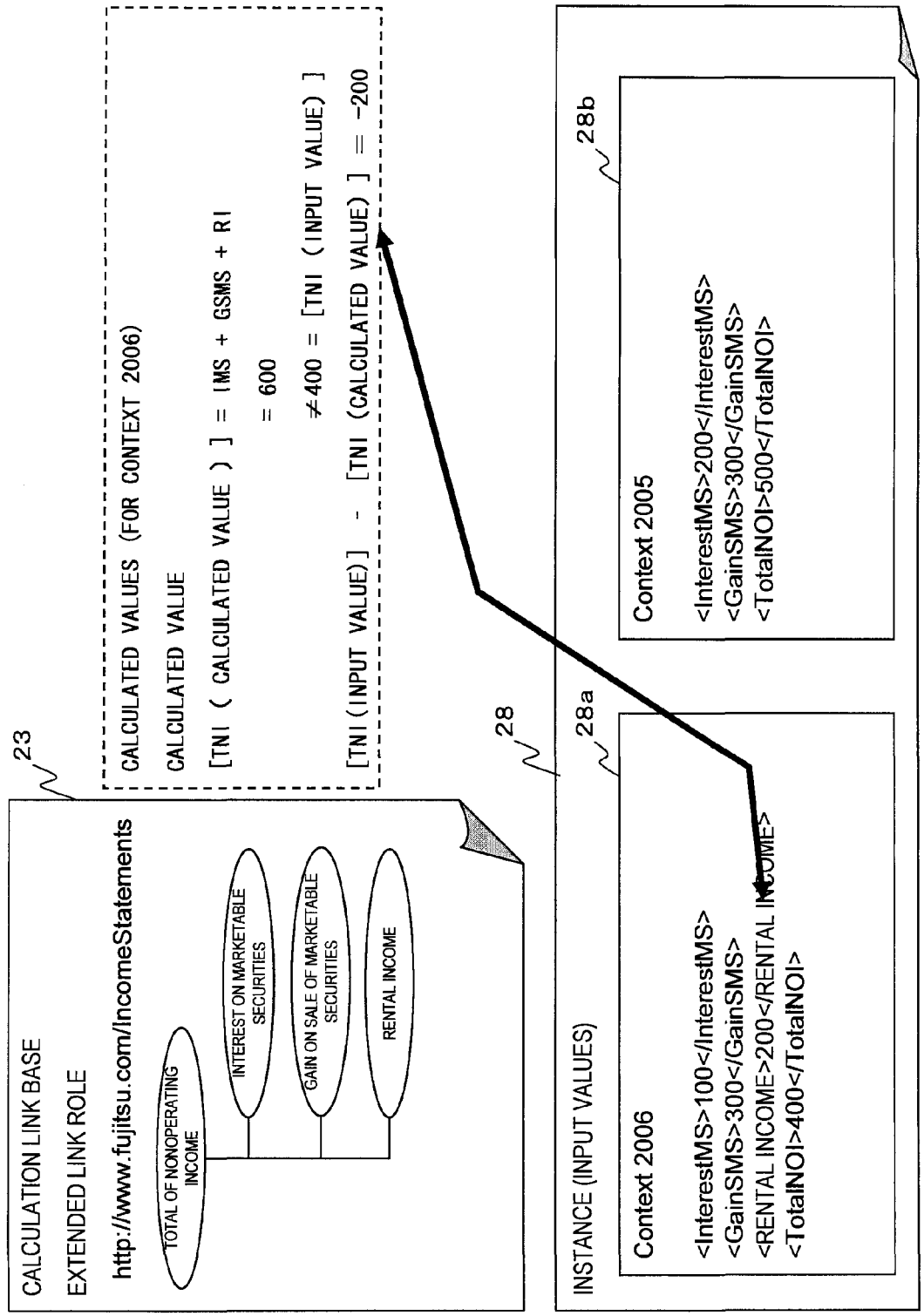
FIG. 15 is a second diagram for describing the third inference logic.

FIG. 15 illustrates a processing example of the third inference logic.

Suppose that, in the instance 28, four elements, "interest on marketable securities" (input value=100), "gain on sale of marketable securities" (input value=300), "rental income" (input value=200) and "total of nonoperating income" (input value=400), are set in the context "Context2006".

Also, suppose that, in the calculation link base 23, the element "total of nonoperating income" is set to reference the elements "interest on marketable securities" (weight=1), "gain on sale of marketable securities" (weight=1) and "rental income" (weight=1).

According to the setting information in the calculation link base 23, an input value of the instance 28 is calculated.

$$\text{calculated value of "total of nonoperating income } (TNI)" = \\ \text{input value 100 of "interest on marketable securities"} * 1.0 + \\ \text{input value 300 of "gain on sale of marketable securities"} * 1.0 + \\ \text{input value 200 of "rental income"} * 1.0 = 600$$

On the other hand, the input value of "total of nonoperating income" is 400. Therefore, the input value (400) is not equal to the calculated value (600), and the difference between them is −200.

Since the input value and the calculated value of the instance 28 do not match, as an element whose parent element is "total of nonoperating income", the elements "interest on marketable securities" and "gain on sale of marketable securities" are extracted from the elements set in the instance 28 based on the display link base 22. Also, as an element whose input value is equal to the difference between the calculated value and the input value, the element "rental income" is specified.

Also, it is checked whether the element "rental income" is set in the tree structure of the display link base 22 used for calculating the input value.

If the element "rental income" is set in the relevant tree structure, the second inference result list is referenced. The setting information of the display link base 22 and the calculation link base 23 were already compared, and the element "rental income" of the calculation link base 23 was added to the second inference result list. Thus, the element "rental income" exists in the second inference result list, and it is therefore inferred that the excess of this element is an error. Information such as the element "rental income", the parent element ("total of nonoperating income"), the context ("Context2006"), the input value (200), and the event (excess of elements in a calculation link base) is then added to the error inference list.

A Fourth Inference Logic

A fourth inference logic is performed if a plurality of contexts Cx and Cy in which same item elements are set are included in the instance 28. If an element which is set in the calculation link base 23 and is not set in the identical context Cy exists in the context Cx, and an input value of the element which exists in the context Cx is equal to the difference between a calculated value and an input value, that element is inferred as an element set in a wrong context.

If a calculated value and an input value are not consistent in a context Cx, the error inference unit 13 specifies an element to which an input value which has the same value as the difference between the calculated value and the input value is set and which is an element of a context Cy which is different from the context Cx. Also, if the specified element is set in the relevant tree structure in the calculation link base 23 and does not exist in the context Cx, the error inference unit 13 infers a context error of the element of the instance.

Figure 16:
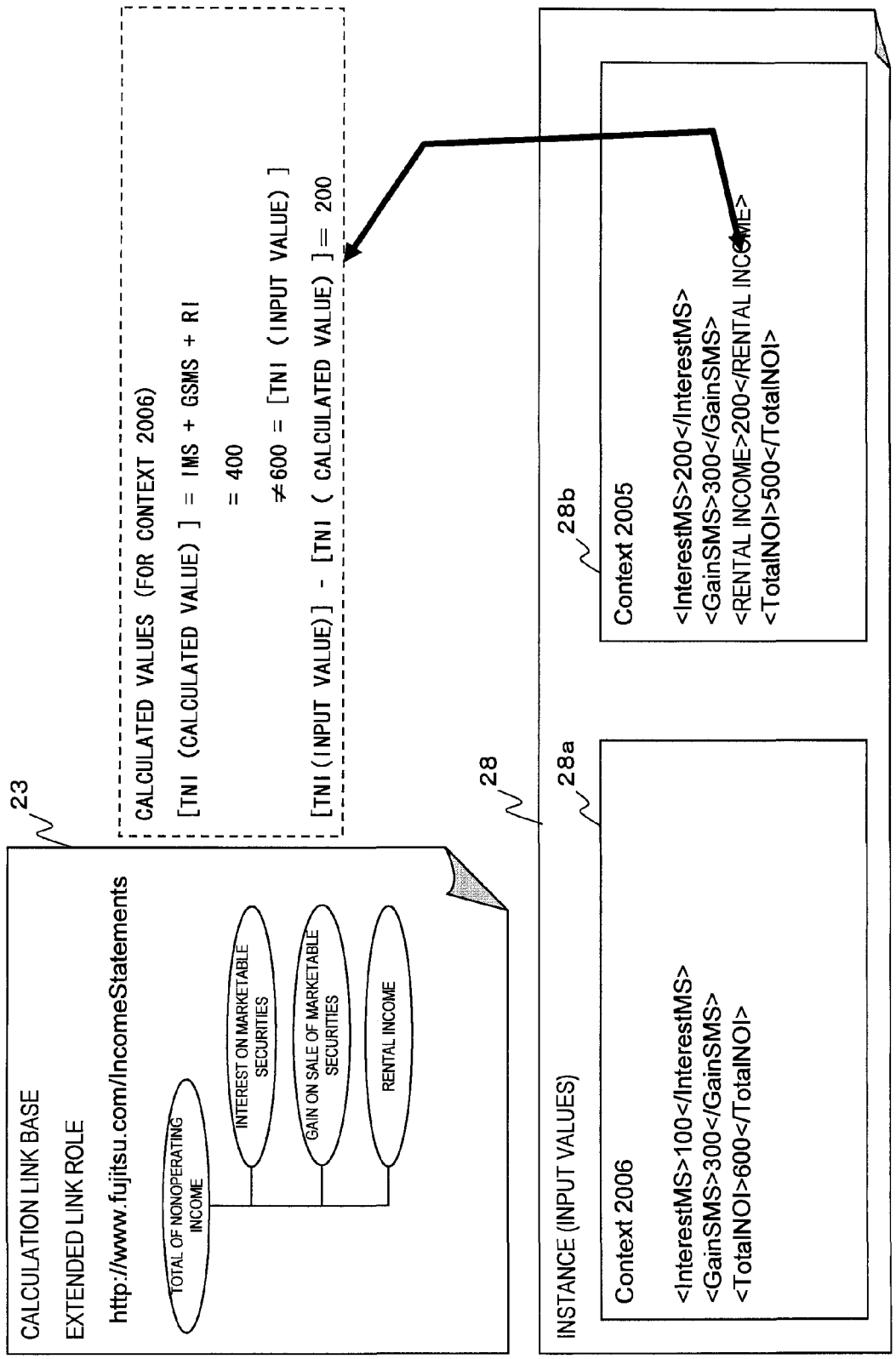
FIG. 16 is a diagram for describing a fourth inference logic.

FIG. 16 illustrates a processing example of the fourth inference logic.

Suppose that, in the instance 28, three elements, "interest on marketable securities" (input value=100), "gain on sale of marketable securities" (input value=300) and "total of nonoperating income" (input value=600), are set in the context "Context2006". Also, suppose that four elements, "interest on marketable securities" (input value=200), "gain on sale of marketable securities" (input value=300), "rental income" (input value=200) and "total of nonoperating income" (input value=500), are set in the context "Context2005".

Also, suppose that, in the calculation link base 23, the element "total of nonoperating income" is set to reference the elements "interest on marketable securities" (weight=1), "gain on sale of marketable securities" (weight=1) and "rental income" (weight=1).

According to the setting information in the calculation link base 23, an input value of the instance 28 is calculated.

calculated value of "total of nonoperating income"

in context "*Context*2006" =

-continued input value 100 of "interest on marketable securities" * 1.0 + input value 300 of "gain on sale of marketable securities" * 1.0 = 400

On the other hand, the input value of "total of nonoperating income" is 600. Therefore, the input value (600) is not equal to the calculated value (400), and the difference between them is 200.

Since the input value and the calculated value of the instance 28 do not match, other element which has an input value consistent with the difference between the input value and the calculated value (200) and does not exist in the current context but exist in other context is specified.

As an element whose parent is the element "total of nonoperating income", the elements "interest on marketable securities", "gain on sale of marketable securities" and "rental income" are extracted from the elements set in the instance 28. Also, as an element which meets the above described conditions, the element "rental income" of the context "Context2005" is specified.

Also, it is checked whether the specified element "rental income" is set in the tree structure of the calculation link base 23 used for calculating the input value.

Since the specified element is set in the relevant tree structure, that element is inferred as a different context error. Information such as the element "rental income", the parent element ("total of nonoperating income"), the context ("Context2005"), the input value (200), and the event (context error) is then added to the error inference list.

After the above described inference processes are finished, the inference result display processing unit 15 outputs the error inference list to the output device 3.

FIG. 17 illustrates an output example of the error inference list. The error inference list is composed of items such as an error event representing an event of an error inferred, an extended link role name representing a name of file in which an error exists, a parent element name of an element that caused an error, an element name, a context, an input value, and the description of an inferred error.

FIGS. 18 to 23 illustrate a processing flow chart of the present invention.

Figure 18:
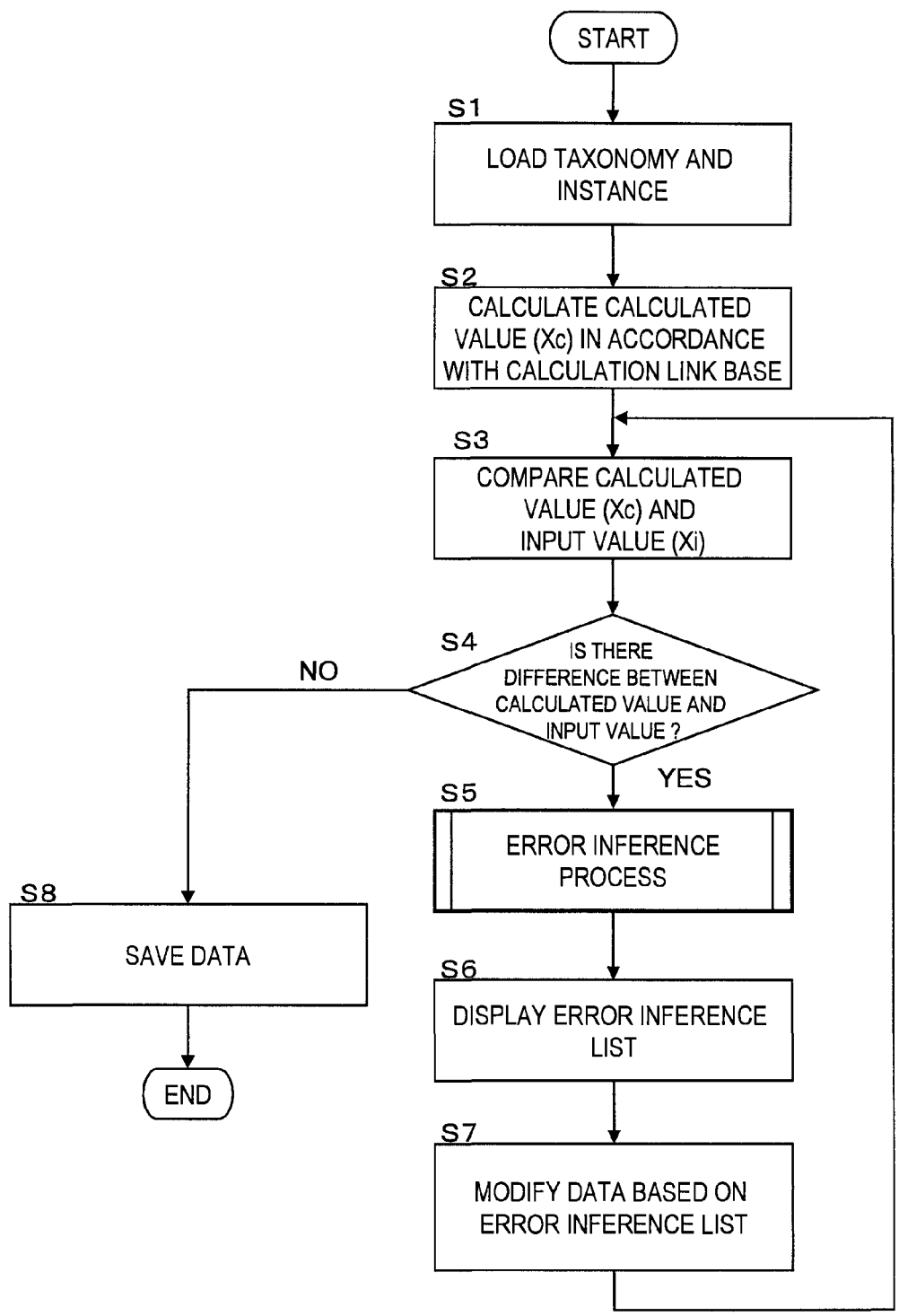
FIG. 18 is a flow chart of an overall process of the present invention.

FIG. 18 is a flow chart of an overall process of the present invention.

The XBRL document acquiring unit 11 loads the taxonomy schema 21, the display link base 22, the calculation link base 23 and the instance 28 from the XBRL document memory unit 2 (step S1).

The error inference unit 13 performs calculation using an input value of the instance 28 based on the setting information in the calculation link base 23 (step S2), and compares the calculated value (Xc) and the relevant input value (Xi) (step S3). If there is a difference between the calculated value (Xc) and the input value (Xi) (YES on the step S4), an error inference process is performed (step S5).

The error inference unit 13 performs the above described first to fourth inference logics. These inference logics are performed in combination.

The inference result display processing unit 15 then displays an error inference list as an inference result on the output device 3 (step S6). Based on the displayed error inference list, the calculation link base 23 or the instance 28 is modified (step S7).

After that, if there is no difference between the calculated value (Xc) and the input value (Xi) (NO on the step S4), the XBRL document saving unit 17 saves the calculation link base 23 or the instance 28 in the XBRL document memory unit 2 (step S8).

Figure 19:
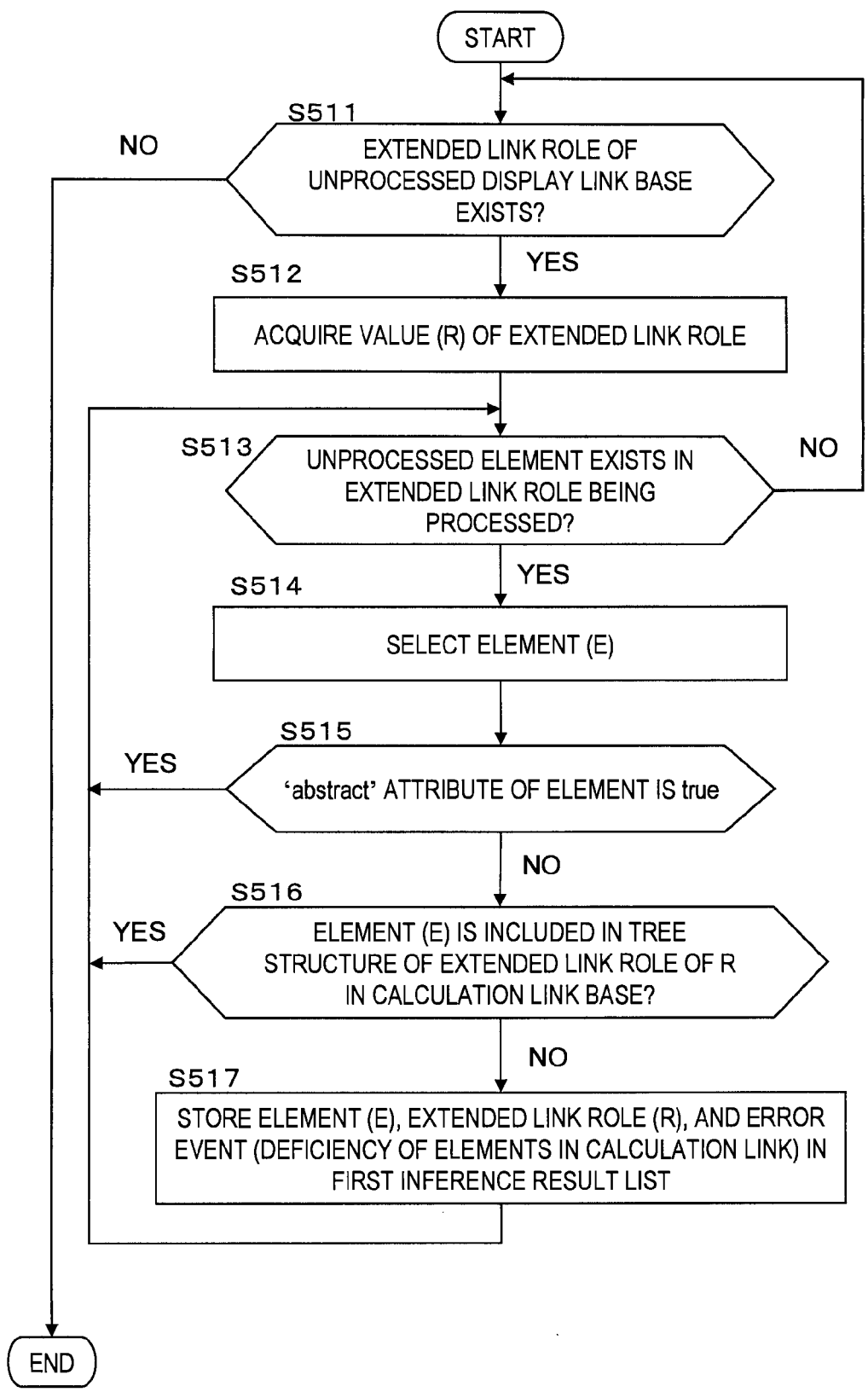
FIG. 19 is a flow chart of a process in accordance with the first inference logic.

FIG. 19 is a flow chart of a process in accordance with the first inference logic.

The error inference unit 13 checks whether an extended link role (file) exists in an unprocessed display link base 22 (step S511) and, if an extended link role exists (YES on the step S511), acquires a value (R) of the extended link role (step S512).

Also, it is checked whether an unprocessed element exists in an extended link role being processed (step S513) and, if an unprocessed element exists (YES on the step S513), the element (E) is selected (step S514). If an unprocessed element does not exist (NO on the step S513), the process goes back to the step S511.

It is checked whether the 'abstract' attribute of the element (E) is "true" (step S515), and if it is not "true" (NO on the step S515), it is checked whether the element (E) is included in the tree structure of the extended link role of R in the calculation link base 23 (step S516). If the element (E) is not included (NO on the step S516), the element (E), the extended link role (R), and the error event (deficiency of elements in a calculation link) are stored in the first inference result list (step S517), and the process goes back to the step S513.

On the other hand, if the 'abstract' attribute of the element (E) is "true" (YES on the step S515) or the element (E) is included in the tree structure of the extended link role of R (YES on the step S516), the process goes back to the step S513.

If an extended link role does not exist in the unprocessed display link base 22 (NO on the step S511), the first inference logic is finished.

Figure 20:
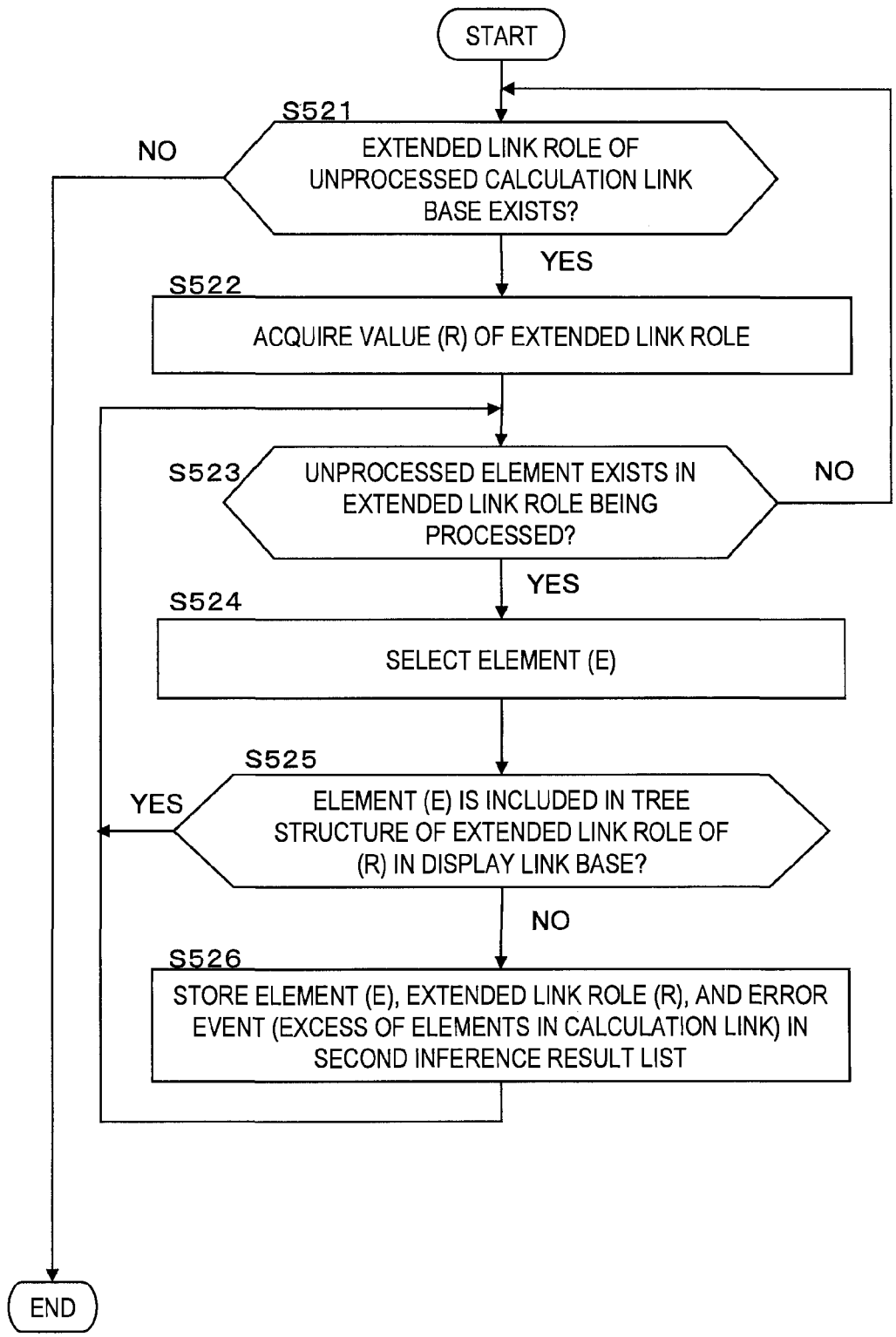
FIG. 20 is a flow chart of a process in accordance with the second inference logic.

FIG. 20 is a flow chart of a process in accordance with the second inference logic.

The error inference unit 13 checks whether an extended link role exists in an unprocessed calculation link base 23 (step S521) and, if an extended link role exists (YES on the step S521), acquires a value (R) of the extended link role (step S522).

Also, it is checked whether an unprocessed element exists in an extended link role being processed (step S523) and, if an unprocessed element exists (YES on the step S523), the element (E) is selected (step S524). If an unprocessed element does not exist (NO on the step S523), the process goes back to the step S521.

It is checked whether the element (E) is included in the tree structure of the extended link role of (R) in the display link base 22 (step S525). If the element (E) is not included (NO on the step S525), the element (E), the extended link role (R), and the error event (excess of elements in a calculation link) are stored in the second inference result list (step S526), and the process goes back to the step S523. On the other hand, if the element (E) is included in the tree structure of the extended link role of (R) (YES on the step S525), the process goes back to the step S523.

If an extended link role does not exist in the unprocessed calculation link base 23 (NO on the step S521), the second inference logic is finished.

Figure 21:
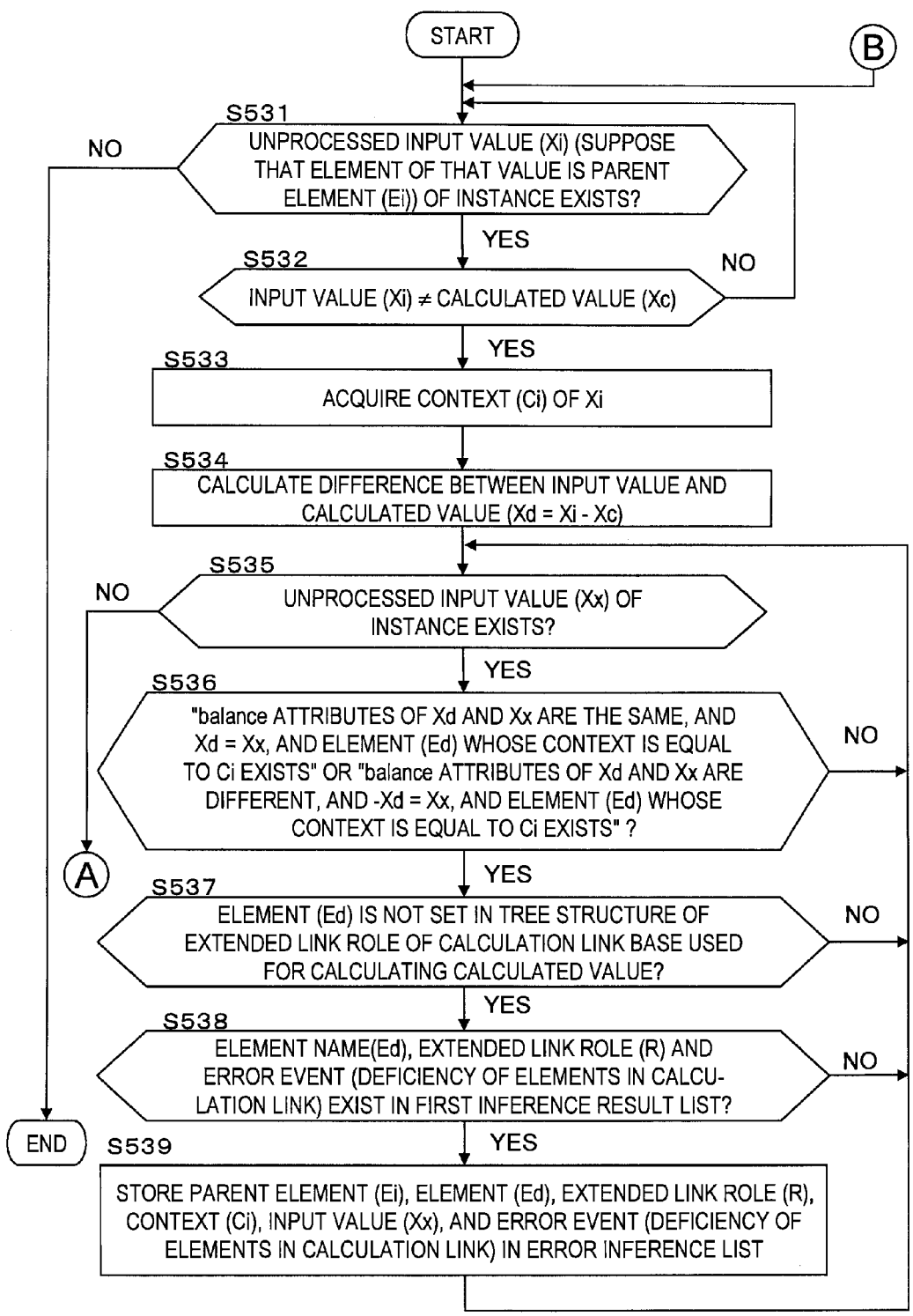
FIG. 21 is a flow chart of a process in accordance with the third inference logic.
Figure 22:
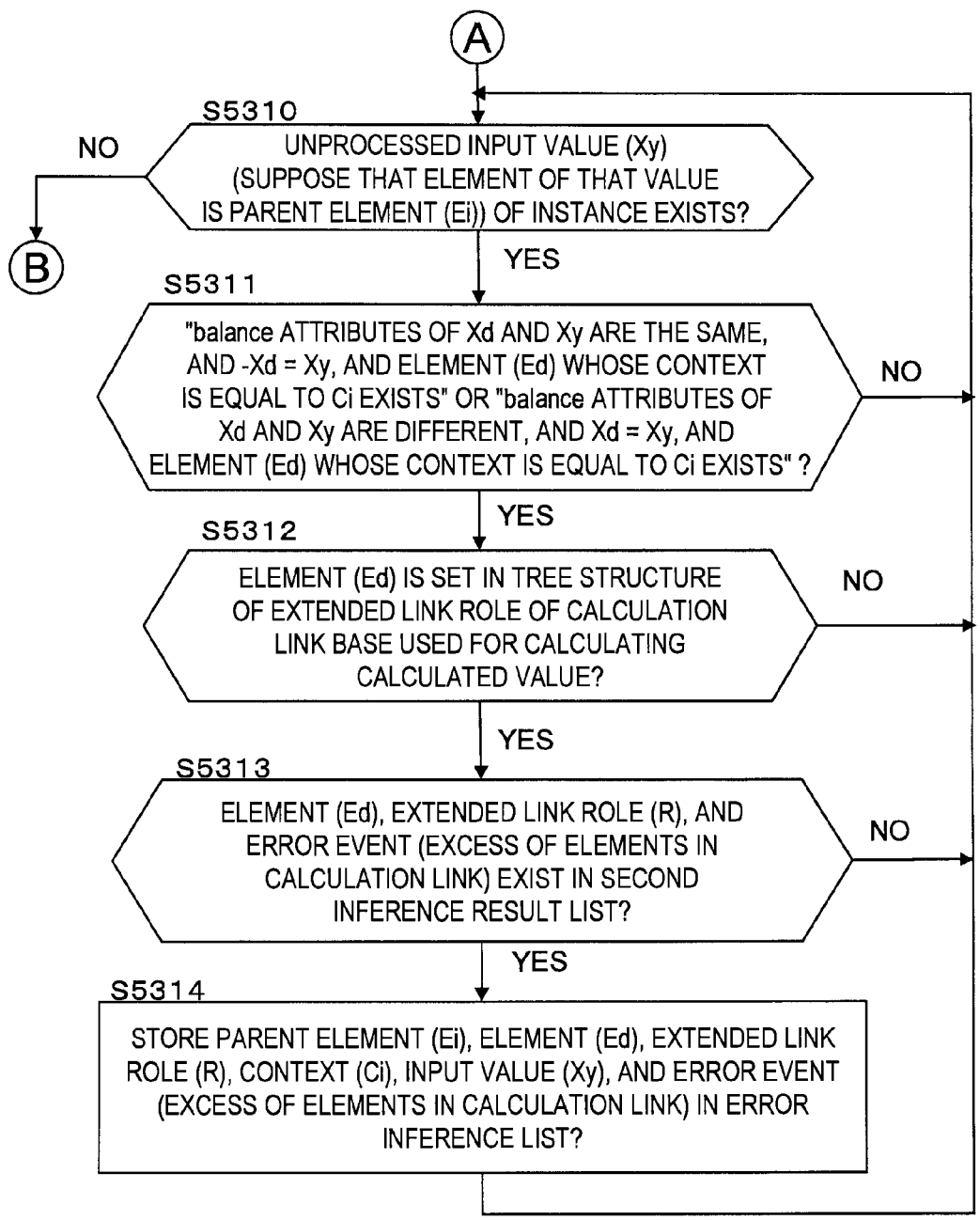
FIG. 22 is a flow chart of a process in accordance with the third inference logic.

FIGS. 21 and 22 are flow charts of a process in accordance with the third inference logic.

The error inference unit 13 checks whether an unprocessed input value (Xi) (suppose that the element of that value is a parent element (Ei)) of an instance 28 exists. This process is iterated for all the values of the instance 28 (step S531).

If an input value (Xi) of the instance 28 exists (YES on the step S531), it is further checked whether the input value (Xi) and a calculated value (Xc) are not equal (step S532). If the input value (Xi) and the calculated value (Xc) are equal (NO on the step S532), the process goes back to the step S531. If the input value (Xi) and the calculated value (Xc) are not equal (YES on the step S532), a context (Ci) of the input value (Xi) is acquired (step S533) and the difference between the input value and the calculated value (Xd=Xi−Xc) is calculated (step S534).

Furthermore, it is checked whether an unprocessed input value (Xx) of the instance 28 exists. This process is iterated for all the values of the instance 28 (step S535). If an input value (Xx) of the instance 28 exists (YES on the step S535), it is determined whether either of the following conditions is met (step S536):

< 'balance' attributes of $Xd$ and $Xx$ are the same, and $Xd = Xx$, and an element ($Ed$) whose context is equal to $Ci$ exists >, or < 'balance' attributes of $Xd$ and $Xx$ are different, and $-Xd = Xx$, and an element ($Ed$) whose context is equal to $Ci$ exists > .

If either of the above described conditions is met (YES on the step S536), it is further checked whether the element (Ed) is not set in the tree structure of the extended link role in the calculation link base 23 used for calculating the calculated value (S537). If the element (Ed) is not set in the tree structure of the relevant extended link role (YES on the step S537), it is further checked whether "the element name (Ed), the extended link role (R), and the error event (deficiency of elements in a calculation link)" exist in the first inference result list (step S538).

If such data exists in the first inference result list (YES on the step S538), "the parent element (Ei), the element (Ed), the extended link role (R), the context (Ci), the input value (Xx), and the error event (deficiency of elements in a calculation link)" are stored in an error inference list (step S539).

On the other hand, if either of the judgment conditions in the step S536 is not met (NO on the step S536), the element (Ed) is set in the relevant tree structure (NO on the step S537), or the relevant data does not exist in the first inference result list (NO on the step S538), the process goes back to the step S535.

Also, if the input value (Xx) of the instance 28 does not exist (NO on the step S535), it is checked whether an unprocessed input value (Xy) (suppose that the element of that value is a parent element (Ei)) of the instance 28 exists. This process is iterated for all the values of the instance 28 (step S5310).

If the input value (Xy) exists (YES on the step S5310), it is determined whether either of the following conditions is met (step S5311):

< 'balance' attributes of $Xd$ and $Xy$ are the same, and $-Xd = Xy$, and an element ($Ed$) whose context is equal to $Ci$ exists >, or < 'balance' attributes of $Xd$ and $Xy$ are different, and $Xd = Xy$, and an element ($Ed$) whose context is equal to $Ci$ exists > .

If either of the above described conditions is met (YES on the step S5311), it is further checked whether the element (Ed) is set in the tree structure of the extended link role in the calculation link base 23 used for calculating the calculated value (Step S5312). If the element (Ed) is set in the tree structure of the relevant extended link role (YES on the step S5312), it is further checked whether "the element name (Ed), the extended link role (R), and the error event (excess of elements in a calculation link)" exist in the second inference result list (step S5313).

If the relevant data exists in the second inference result list (YES on the step S5313), "the parent element (Ei), the element (Ed), the extended link role (R), the context (Ci), the input value (Xy), and the error event (excess of elements in a calculation link)" are stored in the error inference list (step S5314).

On the other hand, if either of the judgment conditions in the step S5311 is not met (NO on the step S5311), the element (Ed) is not set in the corresponding tree structure (NO on the step S5312), or the relevant data does not exist in the second inference result list (NO on the step S5313), the process goes back to the step S5310.

If an unprocessed input value (Xy) of the instance 28 does not exist (NO on the step S5310), the process goes back to the step S531.

Furthermore, on the step S531, if an unprocessed input value (Xi) of the instance 28 does not exist (NO on the step S531), the third inference logic is finished.

Figure 23:
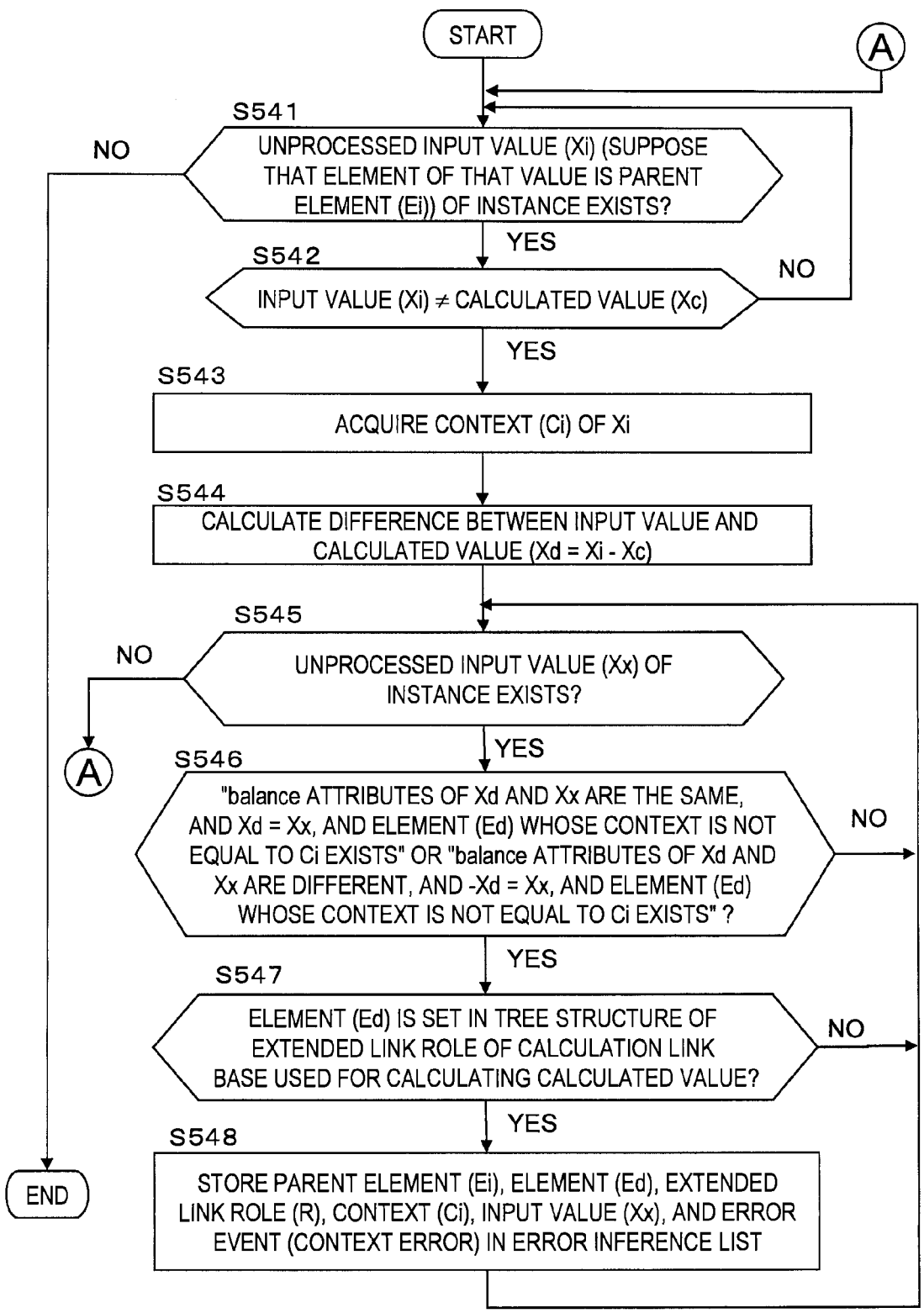
FIG. 23 is a flow chart of a process in accordance with the fourth inference logic.

FIG. 23 is a flow chart of a process in accordance with the fourth inference logic.

The error inference unit 13 checks whether an unprocessed input value (Xi) (suppose that the element of that value is a parent element (Ei)) of an instance 28 exists. This process is iterated for all the values of the instance 28 (step S541).

If an input value (Xi) of the instance 28 exists (YES on the step S541), it is further checked whether the input value (Xi) and a calculated value (Xc) are not equal (step S542). If the input value (Xi) and the calculated value (Xc) are equal (NO on the step S542), the process goes back to the step S541. If the input value (Xi) and the calculated value (Xc) are not equal (YES on the step S542), a context (Ci) of the input value (Xi) is acquired (step S543) and the difference between the input value and the calculated value (Xd=Xi−Xc) is calculated (step S544).

Furthermore, it is checked whether an unprocessed input value (Xx) of the instance 28 exists. This process is iterated for all the values of the instance 28 (step S545). If an unprocessed input value (Xx) of the unprocessed instance 28 exists (YES on the step S545), it is determined whether either of the following conditions is met (step S546):

< 'balance' attributes of Xd and Xx are the same, and Xd = Xx, and an element (Ed) whose context is not equal to Ci exists >, or < 'balance' attributes of Xd and Xx are different, and -Xd = Xx, and an element (Ed) whose context is not equal to Ci exists > .

If either of the above described conditions is met (YES on the step S546), it is further checked whether the element (Ed) is set in the tree structure of the extended link role in the calculation link base 23 used for calculating the calculated value (S547). If the element (Ed) is set in the tree structure of the relevant extended link role (YES on the step S547), "the parent element (Ei), the element (Ed), the extended link role (R), the context (Ci), the input value (Xx), and the error event (context error)" are stored in the error inference list (step S548).

On the other hand, if an unprocessed input value (Xx) of the instance 28 does not exist (NO on the step S545), the process goes back to the step S541.

Furthermore, if an unprocessed input value (Xi) of the instance 28 does not exist (NO on the step S541), the process of the fourth inference logic is finished.

While the present invention has been described in accordance with embodiments thereof, it is natural that the present invention may be modified in various manners within the scope of the gist thereof.

The present invention may be used for a report document creating process of financial information such as a financial statement that uses XBRL for submitting a financial report to government and other public offices, financial institutions, and the like.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

The invention claimed is:

1. A non-transitory computer-readable medium storing a program that causes a computer to perform a process, wherein the computer comprises a document data memory unit that memorizes a taxonomy schema in which each of a plurality of item elements are defined with a tagged structured language, an instance document which includes a context in which an input value is stored in each of the item elements defined in the taxonomy schema, a display link base which includes a hierarchical structure of the item elements of the instance document in display processing, and a calculation link base which includes a reference relationship and a hierarchical structure of the item elements of the instance document in arithmetic processing, the process comprising:

calculating an input value of each of the item elements of the instance document based on the hierarchical structure of the calculation link base;

comparing one of the calculated input values and the stored input value of the instance document corresponding to the item element of the input value calculated in the calculating;

detecting a discrepancy between the calculated input value and the stored input value by the comparing;

specifying a calculation tree structure of the calculation link base in which the item element of the calculated input value in which the discrepancy is detected by the detecting is set;

specifying a display tree structure of the display link base in which the item element of the stored input value in which the discrepancy is detected is set;

comparing the item elements set in both of the calculation tree structure and the display tree structure, and inferring, as an error of the discrepancy, an excess or deficiency of an item element which exists in either of the calculation tree structure or the display tree structure and has an input value which is consistent with an absolute value of the difference between the stored input value and the calculated input value.

2. The non-transitory computer-readable medium according to claim 1, wherein the inferring infers an element deficiency error of the calculation link base when an item element set in the display tree structure does not exist in the calculation tree structure and the difference calculated by subtracting said the calculated value from the input value is consistent with an input value of an item element of the instance document which does not exist in the calculation tree structure.

3. The non-transitory computer-readable medium according to claim 1, wherein the inferring infers an element excess error of the calculation link base when an item element set in the calculation tree structure does not exist in the display tree structure and the difference calculated by subtracting the calculated value from the input value is consistent with a value calculated by inverting a sign of an input value of an item element of the instance document which does not exist in the display tree structure.

4. The non-transitory computer-readable medium according to claim 1, wherein when two or more contexts which should be composed of a same set of item elements are included in the instance document, when an item element set in the calculation tree structure is set in the first context and has an input value which is consistent with the difference calculated by subtracting the calculated value from the input value and the same item element having an input value which is equal to a value calculated by subtracting the calculated value from the input value and inverting a sign is not set in the second context, the inferring infers a context error of said item element.

5. The non-transitory computer-readable medium according to claim 1, the process further comprising:
outputting information about an item element which is inferred as an error as an error inference result of the error inference process.

6. A document error inference processing device comprising:
a document data memory unit that memorizes a taxonomy schema in which each of a plurality of item elements are defined as a tagged structured language, an instance document including a context in which an input value is stored in each of the item elements defined in the taxonomy schema, a display link base including a hierarchical structure of the item elements of the instance document in display processing, and a calculation link base including a reference relationship and a hierarchical structure of the item elements of the instance document in arithmetic processing;
a discrepancy detecting process unit that calculates an input value of each of the item elements of the instance document based on the hierarchical structure of the calculation link base, compares one of the calculated input value and the stored input value of the instance document corresponding to the item element of the input value, and detects a discrepancy between the calculated input values and the stored input value; and
an error inference process unit that specifies a calculation tree structure of the calculation link base in which the item element of the calculated input value in which the discrepancy is detected is set, specifies a display tree structure of the display link base in which the item element of the stored input value in which the discrepancy is detected is set, compares the item elements set in both of the calculation tree structure and the display tree structure, and infers, as an error of the discrepancy, an excess or deficiency of an item element which exists in either of the calculation tree structure or the display tree structure and has an input value which is consistent with an absolute value of the difference between the stored input value and the calculated input value.

7. A document error inference processing method performed by a computer comprising a document data memory unit that memorizes a taxonomy schema in which each of a plurality of item elements are defined as a tagged structured language, an instance document including a context in which an input value is stored in each of the item elements defined in the taxonomy schema, a display link base including a hierarchical structure of the item elements of the instance document in display processing, a calculation link base including a reference relationship and a hierarchical structure of the item elements of the instance document in arithmetic processing, the method comprising:
calculating an input value of each of the item elements of the instance document based on the hierarchical structure in the calculation link base;
comparing one of the calculated input values and the stored input value of the instance document corresponding to the item element of the input value calculated in the calculating;
detecting a discrepancy between the calculated input value and the stored input value by the comparing;
specifying a calculation tree structure of the calculation link base in which the item element of the calculated input value in which the discrepancy is detected by the detecting is set;
specifying a display tree structure of the display link base in which the item element of the stored input value in which the discrepancy is detected is set;
comparing the item elements set in both of the calculation tree structure and the display tree structure; and
inferring, as an error of the discrepancy, an excess or deficiency of an item element which exists in either of the calculation tree structure or the display tree structure and has an input value which is consistent with an absolute value of the difference between the stored input value and the calculated input value.

8. An apparatus comprising:
a first file including a taxonomy schema in which each of a plurality of item elements are defined with a tagged structured language;
a second file including an instance document which includes a context in which an input value is stored in each of the item elements defined in the taxonomy schema;
a third file including a display link base which includes a hierarchical structure of the item elements of the instance document in display processing;
a fourth file including a calculation link base which includes a reference relationship and a hierarchical structure of the item elements of the instance document in arithmetic processing; and
a processing device,
wherein the apparatus executes a process, via the processing device, the process comprising:
calculating an input value of each of the item elements of the instance document based on the hierarchical structure in the calculation link base,
comparing one of the calculated input values and the stored input value of the instance document corresponding to the item element of the input value calculated in the calculating,
detecting a discrepancy between the calculated input value and the stored input value by the comparing, specifying a calculation tree structure of the calculation link base in which the item element of the calculated input value in which the discrepancy is detected by the detecting is set, specifying a display tree structure of the display link base in which the item element of the stored input value in which the discrepancy is detected is set, comparing the item elements set in both of the calculation tree structure and the display tree structure, and inferring, as an error of the discrepancy, an excess or deficiency of an item element which exists in either of the calculation tree structure or the display tree structure and has an input value which is consistent with an absolute value of the difference between the stored input value and the calculated input value.

* * * * *